US012577128B2

(12) United States Patent
Blad

(10) Patent No.: US 12,577,128 B2
(45) Date of Patent: Mar. 17, 2026

(54) PORTABLE WATER PURIFICATION SYSTEMS INCLUDING A MOUNTING ASSEMBLY

(71) Applicant: Steven J. Blad, Arrington, TN (US)

(72) Inventor: Steven J. Blad, Arrington, TN (US)

( * ) Notice: Subject to any disclaimer, the term of this patent is extended or adjusted under 35 U.S.C. 154(b) by 135 days.

(21) Appl. No.: 18/470,903

(22) Filed: Sep. 20, 2023

(65) Prior Publication Data

US 2024/0010521 A1     Jan. 11, 2024

Related U.S. Application Data

(63) Continuation-in-part of application No. 17/834,579, filed on Jun. 7, 2022, now abandoned, which is a continuation-in-part of application No. 16/883,162, filed on May 26, 2020, now Pat. No. 11,352,283, which is a continuation-in-part of application No. 15/961,560, filed on Apr. 24, 2018, now Pat. No. 10,669,181, which is a continuation-in-part of application No. 15/688,056, filed on Aug. 28, 2017, now Pat. No. 10,858,266.

(51) Int. Cl.
*C02F 1/00*     (2023.01)
*C02F 1/32*     (2023.01)

(52) U.S. Cl.
CPC .............. *C02F 1/002* (2013.01); *C02F 1/325* (2013.01); *C02F 2201/32* (2013.01)

(58) Field of Classification Search
None
See application file for complete search history.

(56) References Cited

U.S. PATENT DOCUMENTS 4,296,328 A     10/1981 Regan
5,106,495 A      4/1992 Hughes
(Continued)

FOREIGN PATENT DOCUMENTS

WO     2008130710 A1     10/2008
WO     2015063581 A1      5/2015
WO     2016174667 A1     11/2016

OTHER PUBLICATIONS

PCT International Search Report and Written Opinion, dated Jul. 16, 2018, for International application PCT/US2018/034627; 14 pp.
(Continued)

*Primary Examiner* — Bradley R Spies
(74) *Attorney, Agent, or Firm* — Stinson LLP

(57) ABSTRACT

A portable liquid filtration device includes a portable housing, an inlet defined on the portable housing and oriented to receive liquid therethrough, an outlet defined on the portable housing and oriented to discharge liquid therethrough, and an ultraviolet (UV) chamber in downstream flow communication with the inlet. The UV chamber includes a UV lamp configured to irradiate the liquid with UV light. The device further includes a mounting assembly for coupling the UV chamber to the housing. The mounting device includes a set of rails coupled to the housing and defining a corresponding rail notch, and a clamp. The clamp includes a first grip arm at a first end of the clamp and a flange at a second end of the clamp. The first grip arm is shaped to secure the UV chamber to the clamp and the flange provides a friction fit between the clamp and the rails.

20 Claims, 18 Drawing Sheets

(56)  References Cited

U.S. PATENT DOCUMENTS

| | | | |
|---|---|---|---|
| 5,393,419 | A | 2/1995 | Tiede et al. |
| 5,427,693 | A | 6/1995 | Mausgrover et al. |
| 5,433,848 | A | 7/1995 | Platter et al. |
| 6,558,537 | B1 | 5/2003 | Herrington et al. |
| 6,716,343 | B2 | 4/2004 | Kool et al. |
| 6,814,876 | B1 | 11/2004 | Neal |
| 7,033,506 | B2 | 4/2006 | Lejeune |
| 7,135,106 | B2 | 11/2006 | Marquis et al. |
| 8,728,310 | B1 | 5/2014 | Tjutjunnik |
| 8,808,537 | B1 | 8/2014 | Livingston |
| 9,073,762 | B2 | 7/2015 | Cummins |
| 2001/0040122 | A1 | 11/2001 | Barnes |
| 2004/0168989 | A1 | 9/2004 | Tempest et al. |
| 2009/0041617 | A1 | 2/2009 | Lee |
| 2009/0071331 | A1 | 3/2009 | Gillette |
| 2009/0084734 | A1 | 4/2009 | Yencho |
| 2009/0178968 | A1 | 7/2009 | Cummins |
| 2010/0025337 | A1 | 2/2010 | Yencho |
| 2012/0085691 | A1 | 4/2012 | Cummins |
| 2012/0186658 | A1 | 7/2012 | Kuennen et al. |
| 2014/0094975 | A1 | 4/2014 | Nielsen |
| 2014/0353256 | A1 | 12/2014 | Kaschek et al. |
| 2017/0137304 | A1 | 5/2017 | Adams et al. |
| 2018/0141838 | A1 | 5/2018 | Ben-Shalom et al. |
| 2020/0283321 | A1 * | 9/2020 | Blad ......................... C02F 9/20 |
| 2021/0252517 | A1 * | 8/2021 | Weisshaar .............. C12M 23/52 |

OTHER PUBLICATIONS

Szabo, J., "Disinfection of biological agents in the field using a mobile advanced oxidation process," Sep. 2016, EPA/600/R-16/112, USEPA Office of Research and Development, Cincinnati, Ohio USA; 30 pp.

* cited by examiner

429

431

403

430

PORTABLE WATER PURIFICATION SYSTEMS INCLUDING A MOUNTING ASSEMBLY

CROSS-REFERENCE TO RELATED APPLICATIONS

This application is a continuation-in-part application of U.S. application Ser. No. 17/834,579, filed Jun. 7, 2022, which is a continuation-in-part of U.S. application Ser. No. 16/883,162, filed May 26, 2020 and issued as U.S. Pat. No. 11,352,283 on Jun. 7, 2022, which is a continuation-in-part of U.S. application Ser. No. 15/961,560, filed Apr. 24, 2018, and issued as U.S. Pat. No. 10,669,181 on Jun. 2, 2020, which is a continuation-in-part application and claims the benefit of U.S. application Ser. No. 15/688,056, filed Aug. 28, 2017, and issued as U.S. Pat. No. 10,858,266 on Dec. 8, 2020, all of which are incorporated herein by reference in their entirety.

BACKGROUND

The field of the disclosure relates generally to liquid purification systems, and more particularly to a portable, self-contained water purification device.

In at least some areas of the world, the availability of potable water supplies is minimal or nonexistent. The need for potable water in a particular area may arise from a lack of naturally present potable water, some variety of accidental contamination, or from a natural disaster such as an earthquake or a flood that results in contamination of the water supply. Natural disasters may also result in damage to a disaster area's water supply infrastructure. In natural disaster scenarios, for example, a water purification system may be delivered to the area of need to augment its potable water producing capabilities. However, at least some water purification systems have a weight or bulk that prevents or inhibits transportation to areas of need, and/or power requirements that prevent or inhibit use at areas of need.

At least some known water purification systems include at least one filter and a pump to move water through the filter. Some known water purification systems include multiple filtration steps including introducing ozone to the water and exposing the water to ultraviolet light. However, at least some of these systems are not designed to remove both chemical and biological contaminants such as pesticides and infectious disease carriers.

BRIEF DESCRIPTION

In one aspect, a portable liquid filtration device is provided. The device includes a portable housing, an inlet defined on the portable housing and oriented to receive liquid therethrough, an outlet defined on the portable housing and oriented to discharge liquid therethrough, and an ultraviolet (UV) chamber in downstream flow communication with the inlet. The UV chamber includes a UV lamp configured to irradiate the liquid with UV light. The device further includes a mounting assembly for coupling the UV chamber to the housing. The mounting device includes a set of rails coupled to the housing and defining a corresponding rail notch, and a clamp. The clamp includes a first grip arm at a first end of the clamp and a flange at a second end of the clamp. The first grip arm is shaped to secure the UV chamber to the clamp and the flange provides a friction fit between the clamp and the rails.

In another aspect, a mounting assembly for coupling a UV chamber having a UV lamp to a housing of a portable liquid filtration device is provided. The mounting assembly includes a pair of rails configured to be coupled to the housing that each define a corresponding rail notch therein when coupled to the housing. The mounting assembly further includes a clamp including a grip arm at a first end of the clamp and a flange at a second, opposite end of the clamp. The grip arm is shaped to secure the UV chamber to the clamp and the flange provides a friction fit between the clamp and the pair of rails.

In yet another aspect, a portable liquid filtration device is provided. The device includes a housing and a UV chamber including a UV lamp configured to irradiate the liquid with UV light. The device further includes a set of rails coupled to the housing each defining a corresponding rail notch and a mount. The mount includes a grip arm at a first end of the mount and a flange at a second, opposite end of the mount. The grip arm is shaped to secure the UV chamber to the mount and the flange provides a friction fit between the mount and the set of rails for securing the UV chamber to the housing.

DETAILED DESCRIPTION

The embodiments described herein overcome at least some of the disadvantages of known liquid purification systems. The embodiments include a portable liquid filtration device including a portable housing, an inlet, an ozone chamber, a ultraviolet (UV) chamber, and an outlet. The ozone chamber and UV chamber cooperate to sanitize the received liquid. More specifically, the UV chamber irradiates the received liquid with UV light (i.e., performs advanced oxidation). Some embodiments also include a mounting assembly for coupling the UV chamber to the housing. In such embodiments, the mounting assembly includes a set of rails and a clamp that slidably engages the set of rails to retain the UV chamber in position within the housing. The mounting assembly allows for repositioning of the clamps on the rails to accommodate different configurations and sizes of UV chambers for the device and/or to provide space for a different number of clamps for securing the UV chambers. Some embodiments also include an intermediate cover used to separate sensitive electronic components from UV chambers.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item. As used herein, the term "upstream" refers to an inlet end or inlet area of a component of a portable liquid purification device, and the term "downstream" refers to an outlet end or outlet area of a component of a portable liquid purification device.

Figure 1:
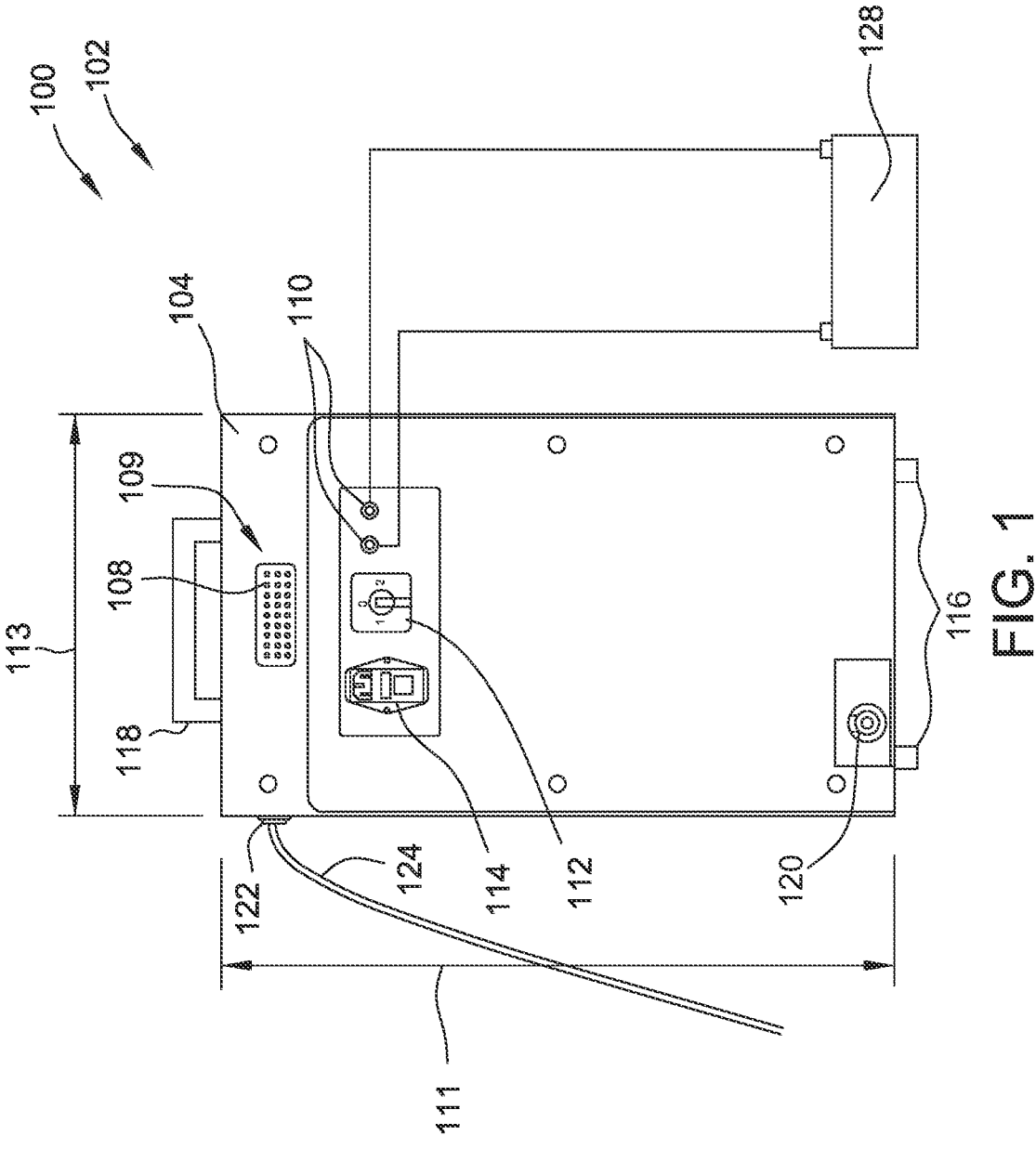
FIG. 1 is a front view of an exemplary portable liquid filtration device.
Figure 2:
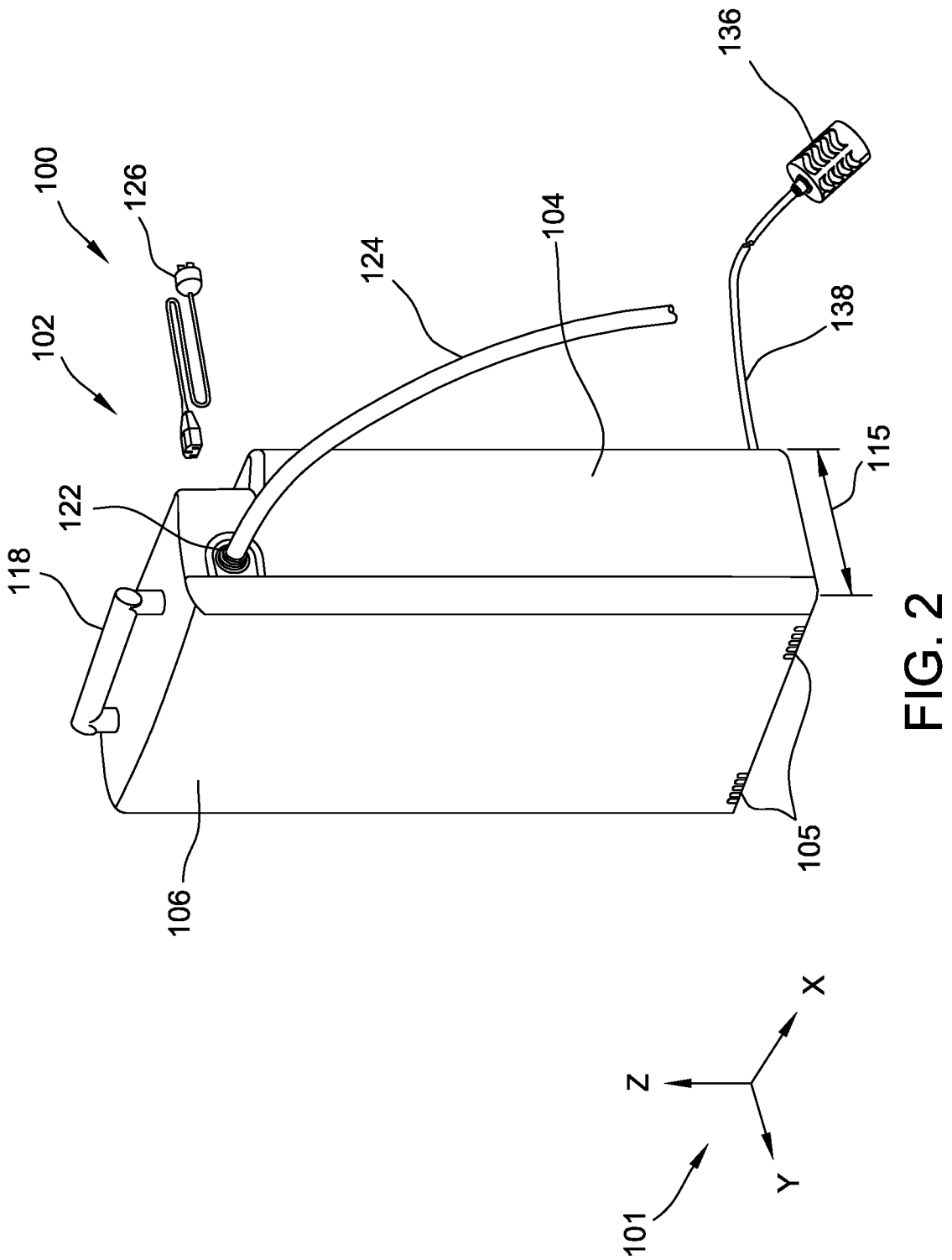
FIG. 2 is a perspective view of the portable liquid filtration device shown in FIG. 1.
Figure 3:
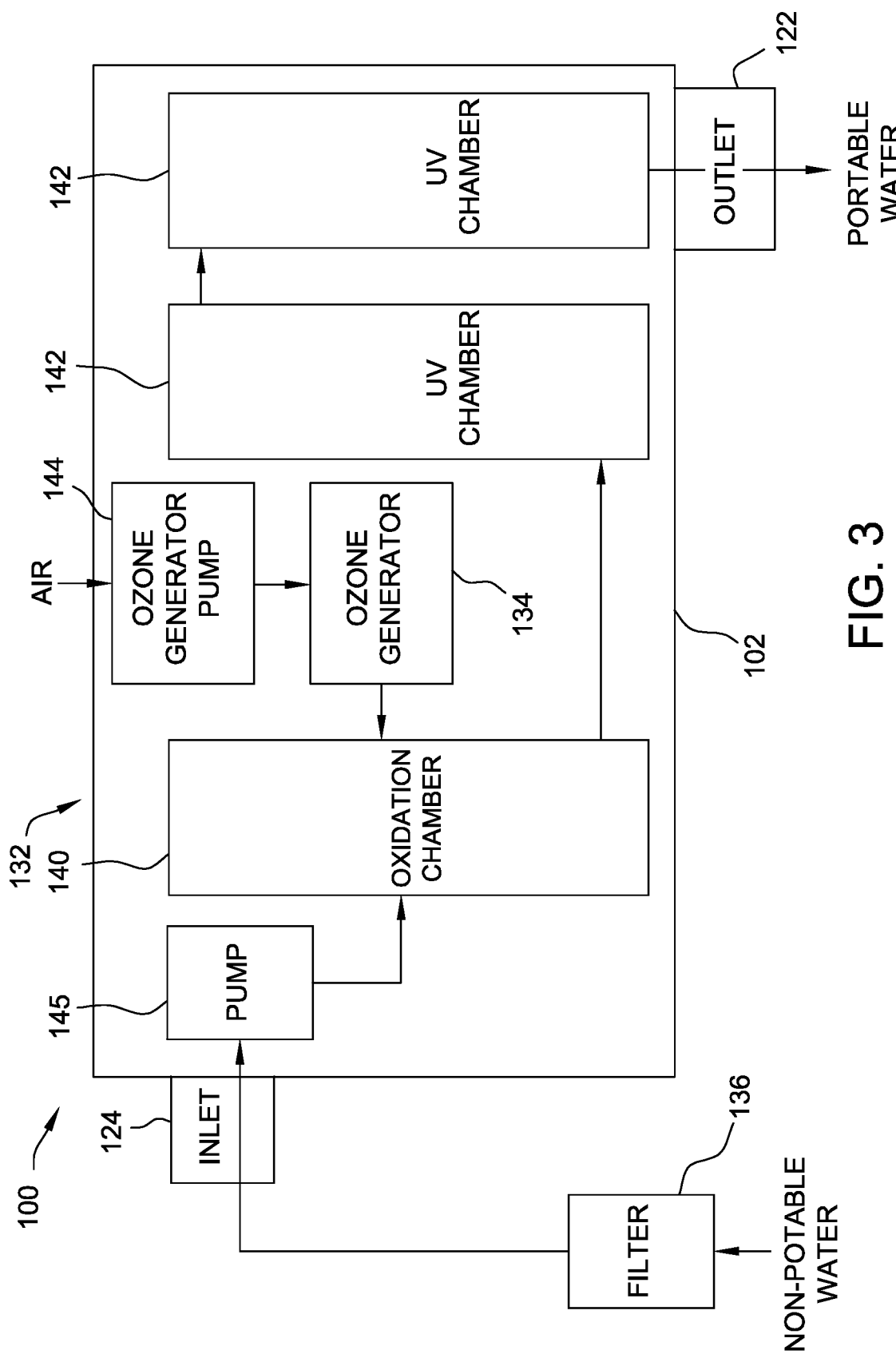
FIG. 3 is a block diagram of the portable liquid filtration device shown in FIG. 1.

FIG. 1 is a front view of an exemplary portable liquid filtration device 100. FIG. 2 is a perspective view of portable liquid filtration device 100 (shown in FIG. 1). FIG. 3 is a block diagram of portable liquid filtration device 100 (shown in FIG. 1). A coordinate system 101 includes an X-axis defining a first, horizontal direction, a Y-axis defining a second, transverse direction, and a Z-axis defining a third, vertical direction, the three axes orthogonal to each other. With reference to FIGS. 1-3, in the exemplary embodiment, portable liquid filtration device 100 includes a portable housing 102 including a front cover 104 and a back cover 106 including a pair of ventilation/drainage openings 105, a vent 108, a pair of direct current (DC) ports 110, an alternating current/DC (AC/DC) switch 112, a male receptacle switch assembly 114, a plurality of wheels 116, a handle 118, and an inlet 120 and outlet 122 positioned on and extending through portable housing 102. Portable housing 102 has a first dimension 111, a second dimension 113, and a third dimension 115, wherein first dimension 111 is greater than second dimension 113 and third dimension 115. In the exemplary embodiment, first dimension 111 extends along the vertical, Z-direction.

In the exemplary embodiment, handle 118 and four wheels 116 are coupled to portable housing 102. More specifically, handle 118 is coupled to a vertically upper portion of back cover 106 and is configured to facilitate grasping, lifting, and transporting portable liquid filtration device 100 by a user. Wheels 116 are coupled to a vertically lower portion of back cover 106 and are configured to facilitate enabling portable liquid filtration device 100 to translate in an substantially XY-plane corresponding to the ground. Vent 108 is coupled to an opening 109 extending through front cover 104 to facilitate an exchange of gas been an interior area of portable housing 102 and an outer environment surrounding portable housing 102. Ventilation/drainage openings 105 extend through a vertically lower portion of back cover 106 and are configured to facilitate additional gas exchange between the interior area of portable housing 102 and the outer environment and to facilitate drainage of any liquid leakage occurring within portable housing 102. In an alternative embodiment, portable housing 102 may include any number and type of handles 118, wheels 116, and vents 108 that facilitate operation of portable liquid filtration device 100 as described herein.

In the exemplary embodiment, an external battery 128 is coupled to DC ports 110 and provides power to portable liquid filtration device 100. In an alternative embodiment, a cord 126 (shown in FIG. 2) may be coupled between an AC power source and male receptacle switch assembly 114 to provide AC power to portable liquid filtration device 100. AC/DC switch 112 facilitates operation of portable liquid filtration device 100 using either AC or DC power, depending on which position AC/DC switch 112 is placed in. In the exemplary embodiment, a position "1" of AC/DC switch 112 enables AC power to be used to operate portable liquid filtration device 100, and a position "2" enables DC power to be used to operate portable liquid filtration device 100. A position "0" of AC/DC switch 112 is an off-position that does not allow power to flow to portable liquid filtration 100 from external battery 128 or power cord 126. In the exemplary embodiment, external battery 128 is a 12 volt, 300 ampere-hour battery. In alternative embodiments, external battery 128 may be any type of battery that facilitates operation of portable liquid filtration device 100 as described herein.

In the exemplary embodiment, inlet 120 is configured to receive non-potable liquid and to channel the non-potable liquid to a filtration assembly 130 housed within portable housing 102. In the exemplary embodiment, the non-potable liquid is non-potable water. In alternative embodiments, inlet 120 is configured to receive non-potable liquids including bodily fluids and water-containing liquids, for example. Filtration assembly 130 includes a filtration duct 132 in downstream fluid communication with inlet 120, an ozone chamber 134 positioned within portable housing 102 and configured to provide ozone to filtration duct 132, an outlet 122 positioned on and extending through portable housing 102 and in downstream flow communication with filtration duct 132, and a middle cover 135 configured to facilitate retaining filtration assembly 130 within portable housing 102. In alternative embodiments, portable liquid filtration device 100 further includes any other component that enables portable liquid filtration device 100 to function as described herein.

In the exemplary embodiment, portable liquid filtration device 100 also includes a sediment filter 136 in upstream flow communication with inlet 120. Sediment filter 136 is configured to remove particulates from the non-potable water channeled through inlet 120. A flexible inlet tube 138 extends between inlet 120 and sediment filter 136. In alternative embodiments, portable liquid filtration device 100 does not include sediment filter 136.

In the exemplary embodiment, filtration duct 132 includes an oxidation chamber 140 and a pair of ultraviolet (UV) chambers 142 coupled together in serial flow communication. An ozone chamber pump 144 is configured to draw air from outside portable housing 102 and channel the air to ozone chamber 134. Ozone chamber 134 is configured to generate an ozone gas from the received air, and channel the ozone gas to introduction into a flow of liquid through oxidation chamber 140. In the exemplary embodiment, ozone chamber 134 generates the ozone gas via a high voltage discharge into the air received from ozone chamber pump 144. In another embodiment, ozone chamber 134 generates the ozone gas via ultraviolet radiation of the air received from ozone chamber pump 144, for example using a dedicated ozone-generating UV lamp that produces radiation at 185 nanometers wavelength. In alternative embodiments, ozone chamber 134 generates the ozone gas in any suitable fashion that enables portable liquid filtration device 100 to function as described herein. In addition, alternatively, air (e.g., ozone gas) may be drawn from outside portable housing 102 with Venturi nozzle 206 (shown in FIG. 5).

Water received through inlet 120 is channeled into oxidation chamber 140, flows through oxidation chamber 140 while mixing with the generated ozone gas, and is channeled into a first of UV chambers 142 that is in downstream flow communication with oxidation chamber 140. After exiting the first of UV chambers 142, the water is channeled into a second of UV chambers 142, flows through the second of UV chambers 142, and is channeled through outlet 122 and a flexible outlet tube 124 as potable water. A water pump 145 is in serial flow communication with filtration duct 132 and inlet 120 to draw in water. In the exemplary embodiment, flow through oxidation chambers 140 and UV chambers 142 is aligned with first dimension 111. In some embodiments, this configuration enables a length of oxidation chambers 140 and/or UV chambers 142 to be a driver of a size of portable housing 102, and facilitates arrangement of other components of portable liquid filtration device 100 to reduce a size of portable housing 102. In alternative embodiments, the components of filtration duct 132 may be arranged in any configuration that enables portable liquid filtration device 100 to function as described herein.

In some embodiments, waste is generated as the water flows through filtration duct 132, and the waste is discharged along with a portion of the received water from at least one liquid waste discharge port 146 (shown in FIG. 7) on portable housing 102. For example, the waste is separated from the primary flow through filtration duct 132 due to a relatively heavier weight and/or a higher momentum of the waste as the flow is channeled through a turn in the flow path through filtration duct 132, and is channeled to liquid waste discharge port 146. In alternative embodiments, waste is not generated in sufficient amounts in filtration duct 132 to merit discharge.

Figure 4:
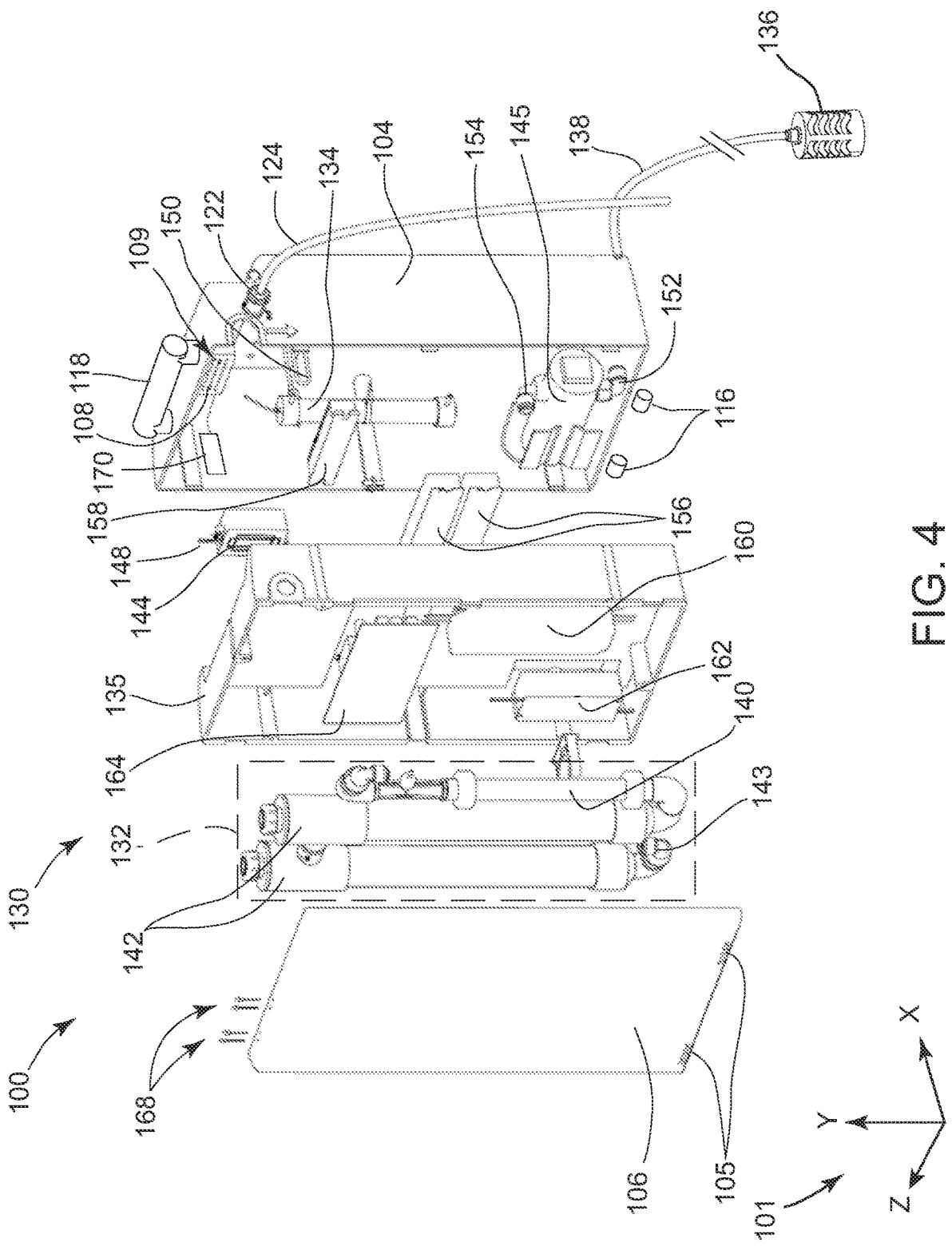
FIG. 4 is an exploded view of the portable liquid filtration device shown in FIG. 1.

FIG. 4 is an exploded view of the portable liquid filtration device 100 (shown in FIG. 1) illustrating an exemplary arrangement of filtration assembly 130 within portable housing 102. In the exemplary embodiment, filtration assembly 130 also includes connecting flow channels between oxidation chamber 140, UV chambers 142, and associated components. In the exemplary embodiment, the received air is channeled through a flexible air delivery tube 148 from ozone chamber pump 144 to ozone chamber 134. Similarly, ozone gas generated by ozone chamber 134 is channeled to oxidation chamber 140 through an ozone delivery tube 150. The received non-potable water is channeled from inlet 120 to water pump 145 through a pump inlet tube 152. The received water is discharged from water pump 145 and is channeled to oxidation chamber 140 through a pump inlet tube 154. After flowing through oxidation chamber 140 and each UV chamber 142, potable water is discharged from the second of UV chambers 142 and is channeled to outlet 122 through a UV chamber discharge tube 143. In alternative embodiments, filtration assembly 130 includes any suitable connecting flow channels that enable portable liquid filtration device 100 to function as described herein.

In the exemplary embodiment, filtration assembly 130 further includes a pair of UV lamp ballasts 156, an electrical distribution block 158, a switching supply transformer 160, an ozone pump transformer 162, an inverter 164, two pairs of indicator lights 168, and a global positioning system (GPS) tracking unit 170. GPS tracking unit 170 is configured to communicate with the global positioning system to facilitate determining a location of portable liquid filtration device 100. Indicator lights 168 are configured to indicate an operational status of a UV lamp 157 (shown in FIG. 6) within each UV chamber 142 during operation of portable liquid filtration device 100, wherein the operational status is at least one of operable, other than optimally operable, and inoperable. Electrical distribution block 158 is configured to receive electrical power from an electrical power source via a power cord 126 and/or DC ports 110. Inverter 164 is configured to receive DC power from DC ports 110, convert the received DC power to AC power, and output the AC power to filtration assembly 130. In alternative embodiments, AC and/or DC power may be received by any means that facilitates operation of portable liquid filtration device 100 as described herein.

In the example embodiment, power cord 126 is configured to interface with a male receptacle switch assembly 114 and with a U.S. National Electrical Manufacturers Association (NEMA) 5-15 receptacle. In alternative embodiments, power cord 126 is configured to interface with any type of receptacle that enables portable liquid filtration device 100 to function as described herein. In other alternative embodiments, portable liquid filtration device 100 includes an internal battery 166 (shown in FIG. 8) and inverter 164 is configured to receive DC power from internal battery 166 and transmit AC power to filtration assembly 130. In yet another alternative embodiment, portable liquid filtration device 100 includes both power cord 126 and internal battery 166, and portable liquid filtration device 100 is selectively switchable between the power sources. In some embodiments, internal battery 166 is rechargeable and/or replaceable.

In the exemplary embodiment, electrical distribution block 158 distributes power from the active power source, for example power cord 126 inverter 164, to the various components of portable liquid filtration device 100. For example, each UV lamp ballast 156 receives electrical power from electrical distribution block 158 and is used to limit the flow of electrical power through each UV lamp 157. For another example, ozone pump transformer 162 receives electrical power from electrical distribution block 158 via switching supply transformer 160 and steps up or down the line voltage of the received AC power to meet the requirements of ozone chamber pump 144 before transmitting the electrical power to ozone chamber pump 144. In alternative embodiments, AC and/or DC power is distributed to the components of portable liquid filtration device 100 in any suitable fashion that enables portable liquid filtration device 100 to function as described herein.

Figure 5:
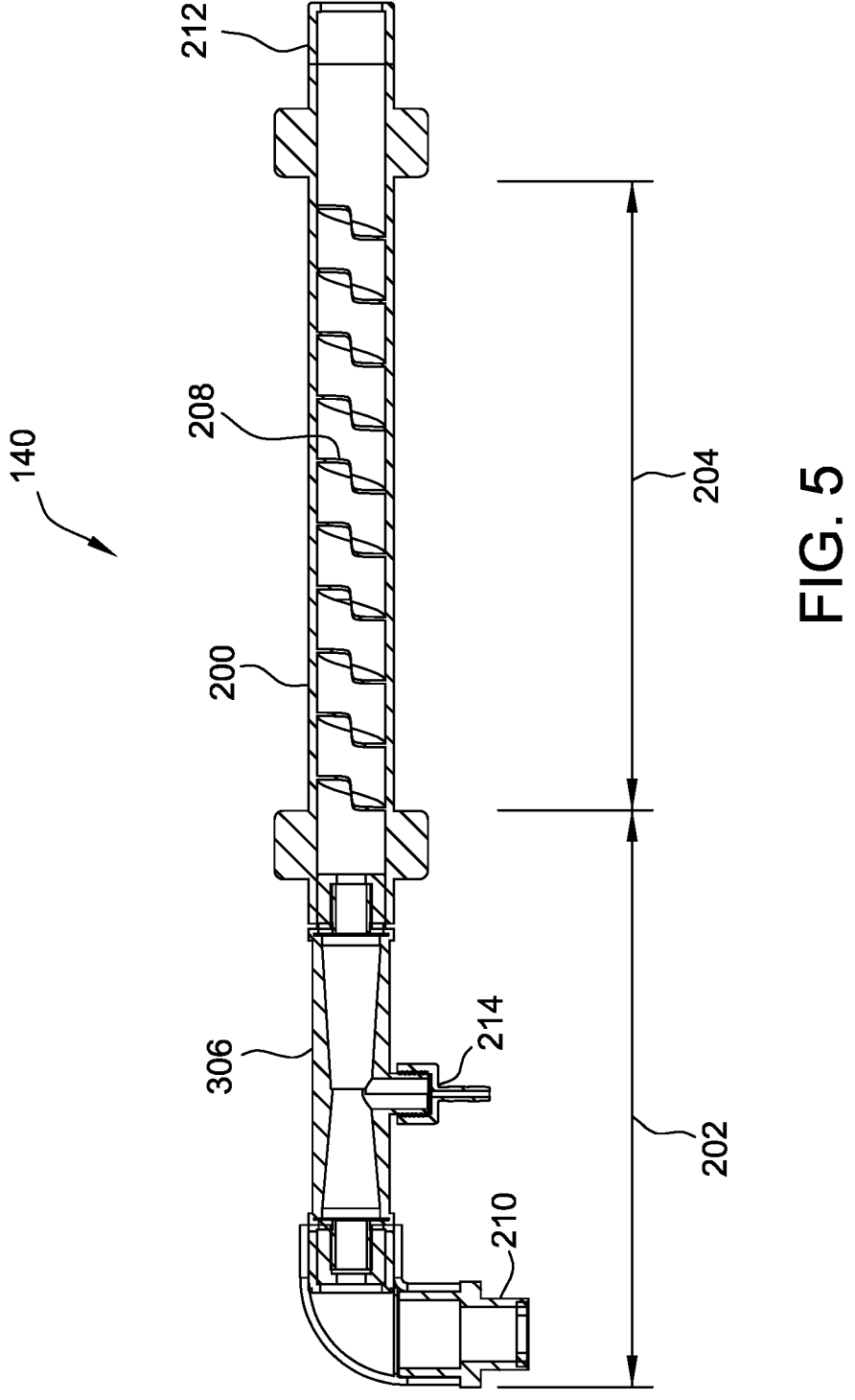
FIG. 5 is a sectional side view of an exemplary oxidation chamber that may be used with the filtration assembly shown in FIG. 3.

FIG. 5 is a sectional side view of exemplary oxidation chamber 140 that may be used with filtration assembly 130 (shown in FIG. 4). As described above, oxidation chamber 140 is configured to mix the non-potable water received from inlet 120 with the ozone gas received from ozone chamber 134. In the exemplary embodiment, oxidation chamber 140 includes a generally tubular oxidation chamber body 200 that includes a first mixing portion 202 and a second mixing portion 204 in downstream flow communication with first mixing portion 202. oxidation chamber 140 is configured to receive water through an oxidation chamber inlet 210, channel the water serially through first mixing portion 202 and second mixing portion 204, and channel the water out of oxidation chamber 140 via an oxidation chamber outlet 212.

In the exemplary embodiment, first mixing portion 202 includes an ozone gas inlet 120 configured to channel the ozone gas from ozone chamber 134 into first mixing portion 202. In the exemplary embodiment, first mixing portion 202 also includes a Venturi nozzle 206 configured to increase a flow speed and/or turbulence of the received water proximate to ozone gas inlet 214, such that interaction between the ozone gas and the received water and the absorption of the ozone gas by the received water is increased. For example, in some embodiments, a mixing efficiency of first mixing portion 202 is at least 25 percent. In an alternative embodiment, ozone gas inlet 120 is configured to divide the ozone gas into a plurality of separate streams of the ozone gas before introducing the ozone gas into first mixing portion 202 to facilitate increasing absorption of the ozone gas by the received water. In other alternative embodiments, oxidation chamber 140 is configured to receive the ozone gas at any suitable location along oxidation chamber 140, and/or first mixing portion 202 does not include Venturi nozzle 206. In yet other alternative embodiments, a plurality of ozone gas inlets 120 are located along oxidation chamber 140 and are configured to introduce the ozone gas into the received water at a plurality of locations to facilitate increasing absorption of the ozone gas by the received water.

In the exemplary embodiment, second mixing portion 204 includes a mixing vane 208 configured to facilitate further mixing of the received water with the ozone gas within oxidation chamber 140. More specifically, in the exemplary embodiment, mixing vane 208 has a helical spiral shape. In alternative embodiments, mixing vane 208 has any suitable shape that enables portable liquid filtration device 100 to function as described herein. In some embodiments, oxidation chamber 140 has a length of less than 20 inches. For example, Venturi nozzle 206 has a length of about 5 inches and mixing vane 208 has a length of about 10 inches. In alternative embodiments, each of oxidation chamber 140, Venturi nozzle 206, and mixing vane 208 has any suitable length that enables portable liquid filtration device 100 to function as described herein. In alternative embodiments, oxidation chamber 140 has any suitable number and type of mixing portions that enables portable liquid filtration device 100 to function as described herein.

Figure 6:
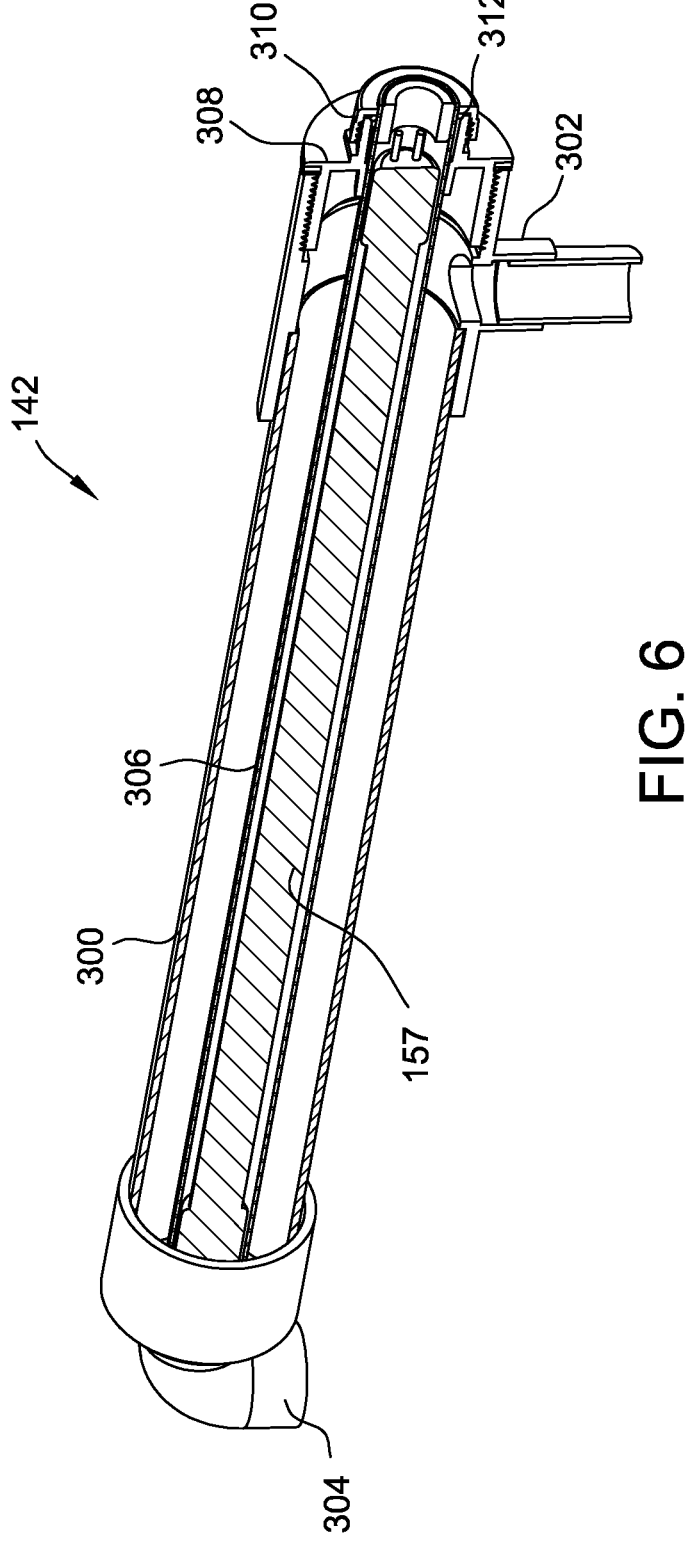
FIG. 6 is a partial sectional side view of an exemplary ultraviolet (UV) chamber that may be used with the filtration assembly shown in FIG. 3.

FIG. 6 is a partial sectional side view of exemplary UV chamber 142 that may be used with filtration assembly 130 (shown in FIG. 4). UV chamber 142 includes a generally tubular body 300 and is configured to receive water through one of a first end 302 and a second end 304, channel the water through tubular body 300, and channel the water out of UV chamber 142 through the other of first end 302 and second end 304. UV chamber 142 also includes a UV lamp 157 positioned adjacent the water flowing through UV chamber 142 and configured to irradiate the water with UV light to facilitate sterilizing organic material suspended within the water.

More specifically, in the exemplary embodiment, tubular body 300 circumscribes UV lamp 157, such that UV light emitted from UV lamp 157 in substantially all directions irradiates the water flowing along an annular path around UV lamp 157 through UV chamber 142, thus increasing an efficiency of UV chamber 142. For example, UV lamp 157 is located within a substantially translucent UV lamp tube 306 that extends coaxially with, and is circumscribed by, tubular body 300, such that UV lamp 157 is physically isolated from the water flowing through UV chamber 142. In alternative embodiments, UV lamp 157 is positioned with respect to UV chamber 142 in any suitable manner that enables portable liquid filtration device 100 to function as described herein.

Further in the exemplary embodiment, UV chamber 142 includes a UV chamber top cap 308 removably coupled to first end 302 such that UV lamp 157 and UV lamp tube 306 may be withdrawn from UV chamber 142 by uncoupling UV chamber top cap 308 from UV chamber tubular body 300. Additionally, UV chamber 142 includes a UV tube cap 310 removably coupled to UV chamber top cap 308 such that UV lamp 157 may be withdrawn from UV lamp tube 306 by uncoupling UV tube cap 310 from UV chamber top cap 308. A silicon O-ring 312 is positioned between UV chamber top cap 308 and UV tube cap 310 to facilitate stabilizing UV lamp tube 306 within UV chamber 142. In alternative embodiments, UV lamp 157 and/or UV lamp tube 306 are coupled to UV chamber 142 in any suitable fashion using any suitable components that enable portable liquid filtration device 100 to function as described herein. As shown in FIG. 3, in the exemplary embodiment, pair of UV chambers 142 is oriented such that water is channeled serially into second end 304 of a first of UV chambers 142, out of first end 302 of the first of UV chambers 142, into first end 302 of a second of UV chambers 142, and out of second end 304 of the second of UV chambers 142. This orientation facilitates placement of caps 308 and 310 of both UV chambers 142 adjacent to each other while reducing a flow path length between the two, such that UV lamp 157 of both UV chambers 142 may be replaced from the same end of filtration assembly 130. In alternative embodiments, UV chambers 142 are oriented in any suitable fashion that enables portable liquid filtration device 100 to function as described herein.

In some embodiments, each UV chamber 142 has a length of less than 24 inches. In alternative embodiments, each UV chamber 142 has any suitable length that enables portable liquid filtration device 100 to function as described herein.

In certain embodiments, at least one oxidation chamber 140 (shown in FIG. 5) further includes a separate UV lamp 157 positioned adjacent the water flowing through oxidation chamber 140, for example coupled to oxidation chamber 140 as described above with respect to UV chamber 142, or in any other suitable fashion. In some such embodiments, sanitization of the received water is further improved by the additional UV treatment occurring simultaneously with the ozone mixing in at least one oxidation chamber 140. In other embodiments, oxidation chamber 140 does include a UV lamp 157 positioned adjacent oxidation chamber 140.

Figure 7:
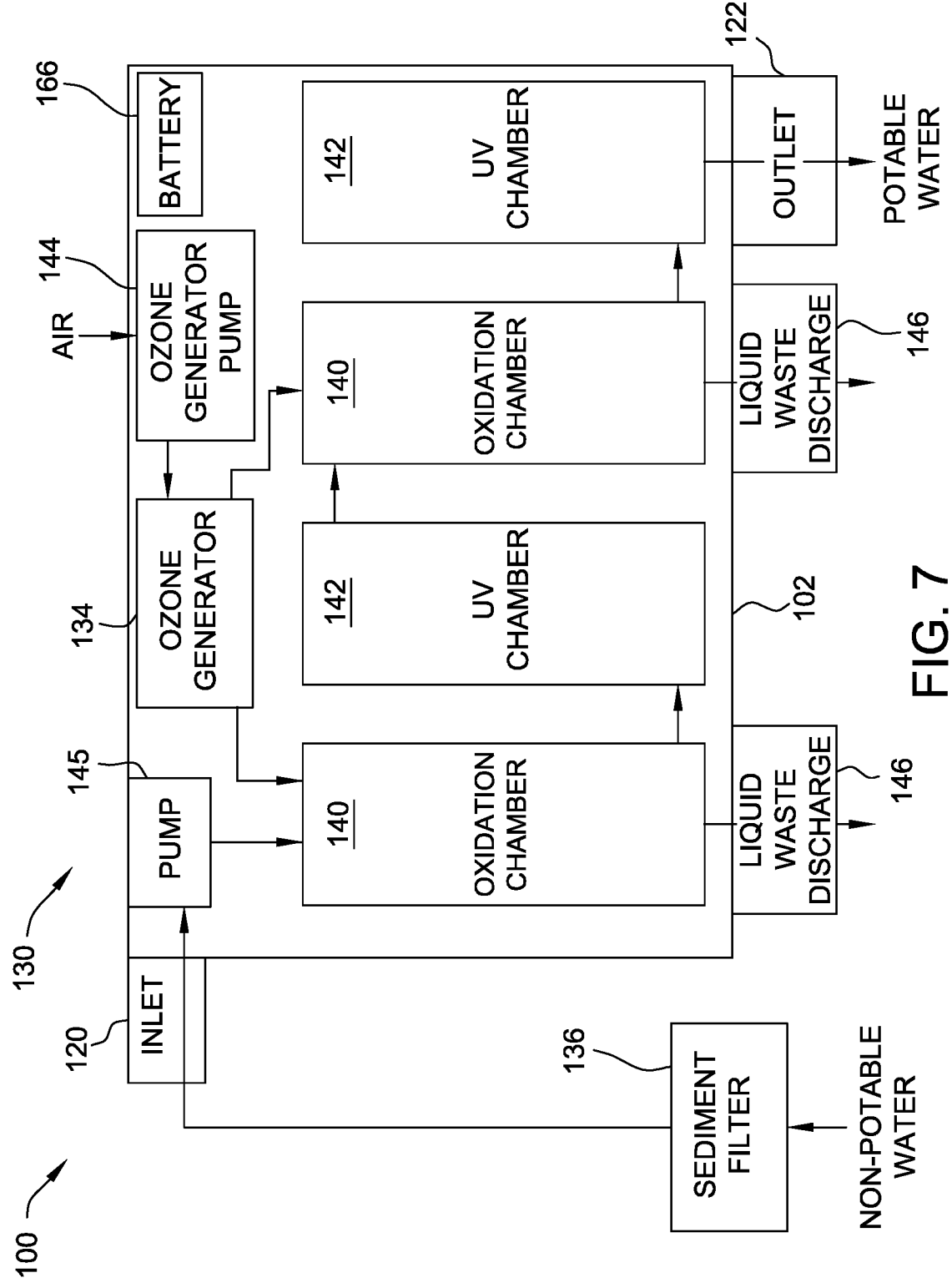
FIG. 7 is a block diagram of another alternative embodiment of the portable liquid filtration device shown in FIG. 1.

FIG. 7 is a block diagram of an alternative embodiment of portable liquid filtration device 100 (shown in FIG. 1) illustrating an alternative filtration assembly 130. The embodiment shown in FIG. 7 is substantially identical to the embodiment shown in FIG. 1, except filtration assembly 130 includes an additional oxidation chamber 140 as part of filtration duct 132. In addition, the embodiment of FIG. 7 illustrates internal battery 166 for providing power for operation of portable liquid filtration device 100, as well as the at least one liquid waste discharge port 146. Although internal battery 166 is illustrated as included within portable housing 102, in alternative embodiments, portable liquid filtration device 100 is coupled to external battery 128 located outside and separate from portable liquid filtration device 100.

More specifically, in the exemplary embodiment, filtration duct 132 includes a pair of oxidation chambers 140 and a pair of UV chambers 142 coupled together in serial flow communication. Ozone chamber 134 is configured channel a first portion of the generated ozone gas to a first of oxidation chambers 140 and a second portion of the generated ozone gas to a second of oxidation chambers 140 via parallel flow ozone delivery tubes 150. In alternative embodiments, portable liquid filtration device 100 includes any suitable number of oxidation chambers 140 and UV chambers 142 that enables portable liquid filtration device 100 to function as described herein.

In the exemplary embodiment, water received through inlet 120 is channeled into the first of oxidation chambers 140, flows through the first of oxidation chambers 140, and is channeled to a first of UV chambers 142. The first of UV chambers 142 is in downstream flow communication with the first of oxidation chambers 140 and receives the water from oxidation chamber outlet 122. Water flows through the first of UV chambers 142, is irradiated by UV lamp 157, and is channeled out of the first of UV chambers 142. The water is then channeled into a second of oxidation chambers 140, flows through the second of oxidation chambers 140, and is channeled into a second of UV chambers 142. Water received by the second of UV chambers 142 flows through the second of UV chambers 142, is irradiated by UV lamp 157, exits the second of UV chambers 142. After the water exits the second of UV chambers 142 the water is discharged through outlet 122 as potable water. In alternative embodiments, portable liquid filtration device 100 includes any suitable arrangement of the components of filtration assembly 130 that enables portable liquid filtration device 100 to function as described herein.

As described above, in some embodiments, waste is generated as the water flows through filtration duct 132, and discharged from at least one liquid waste discharge port 146. In the exemplary embodiment, a first portion of the waste is generated as the water flows through the first of oxidation chambers 140. The first portion of waste is separated from the primary flow through filtration duct 132, such as by a relatively heavier weight and/or a higher momentum of the waste as the flow turns at the chamber outlet, and is channeled to a first liquid waste discharge port 146 on portable housing 102 for discharge from portable liquid filtration device 100. Similarly, a second portion of waste is generated as the water flows through the second of oxidation chambers 140, separated from the primary flow through filtration duct 132, and channeled to a second liquid waste discharge port 146 on portable housing 102 for discharge from portable liquid filtration device 100. In alternative embodiments, waste generated as the water flows through filtration duct 132 is separated and discharged from portable liquid filtration device 100 in any suitable fashion that enables portable liquid filtration device 100 to function as described herein. In other alternative embodiments, waste is not generated in sufficient amounts to merit discharge from filtration duct 132.

In some embodiments, as described above, portable liquid filtration device 100 receives power from external battery 128 and/or internal battery 166. In some such embodiments, operating power requirements of portable liquid filtration device 100 are such that external battery 128 and/or internal battery 166, implemented as a 12-volt, 300 ampere-hour battery, is sufficient to operate portable liquid filtration device 100 for at least ten hours and/or to produce at least 2,000 total liters of potable water, before external and/or internal battery 166 requires a recharge or replacement. In alternative embodiments, external battery 128 and/or internal battery 166 operates portable liquid filtration device 100 to produce any suitable amount of potable water over a single charge of internal battery 166.

Figure 8:
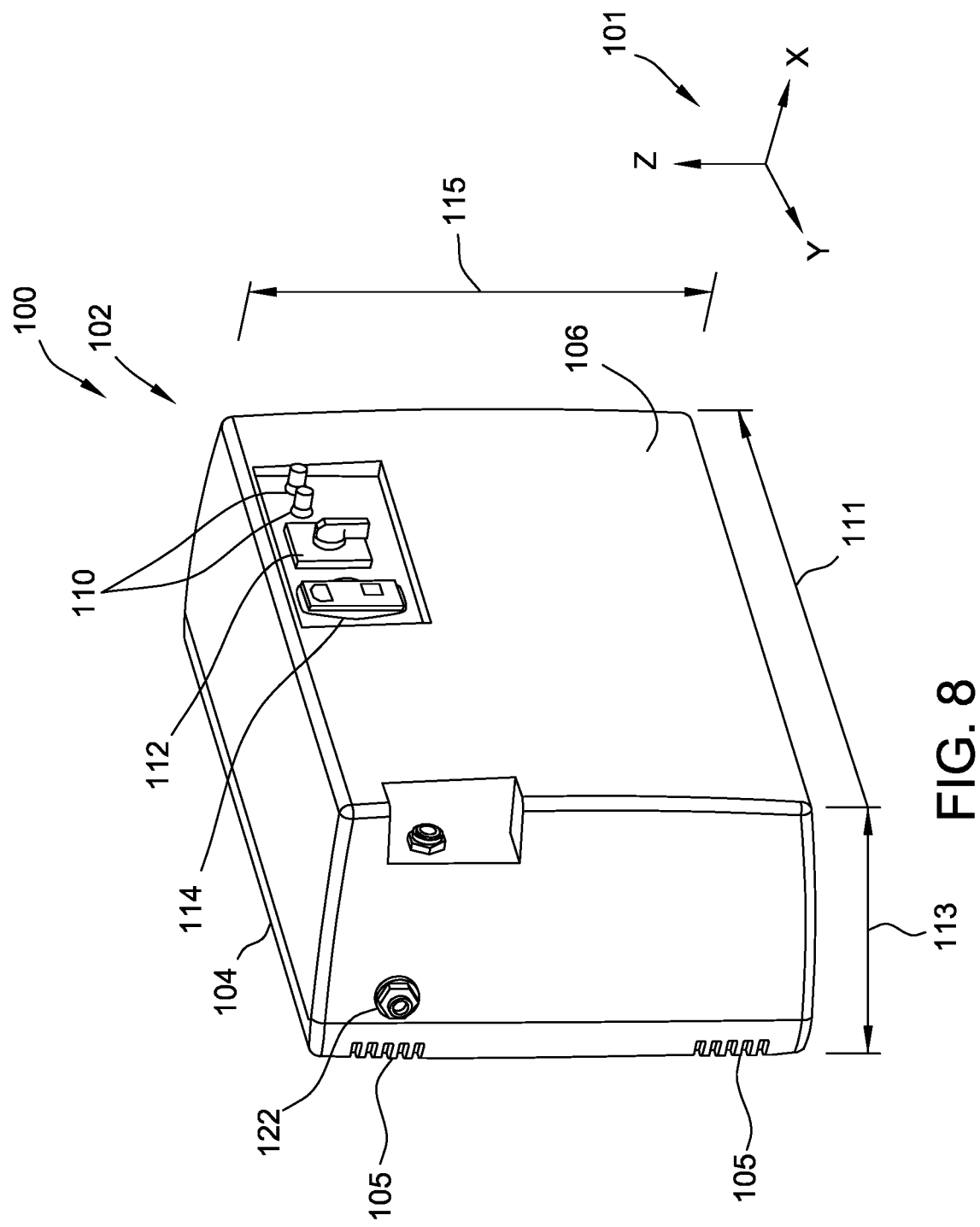
FIG. 8 is a perspective view of an alternative embodiment of the portable liquid filtration device shown in FIG. 1.
Figure 9:
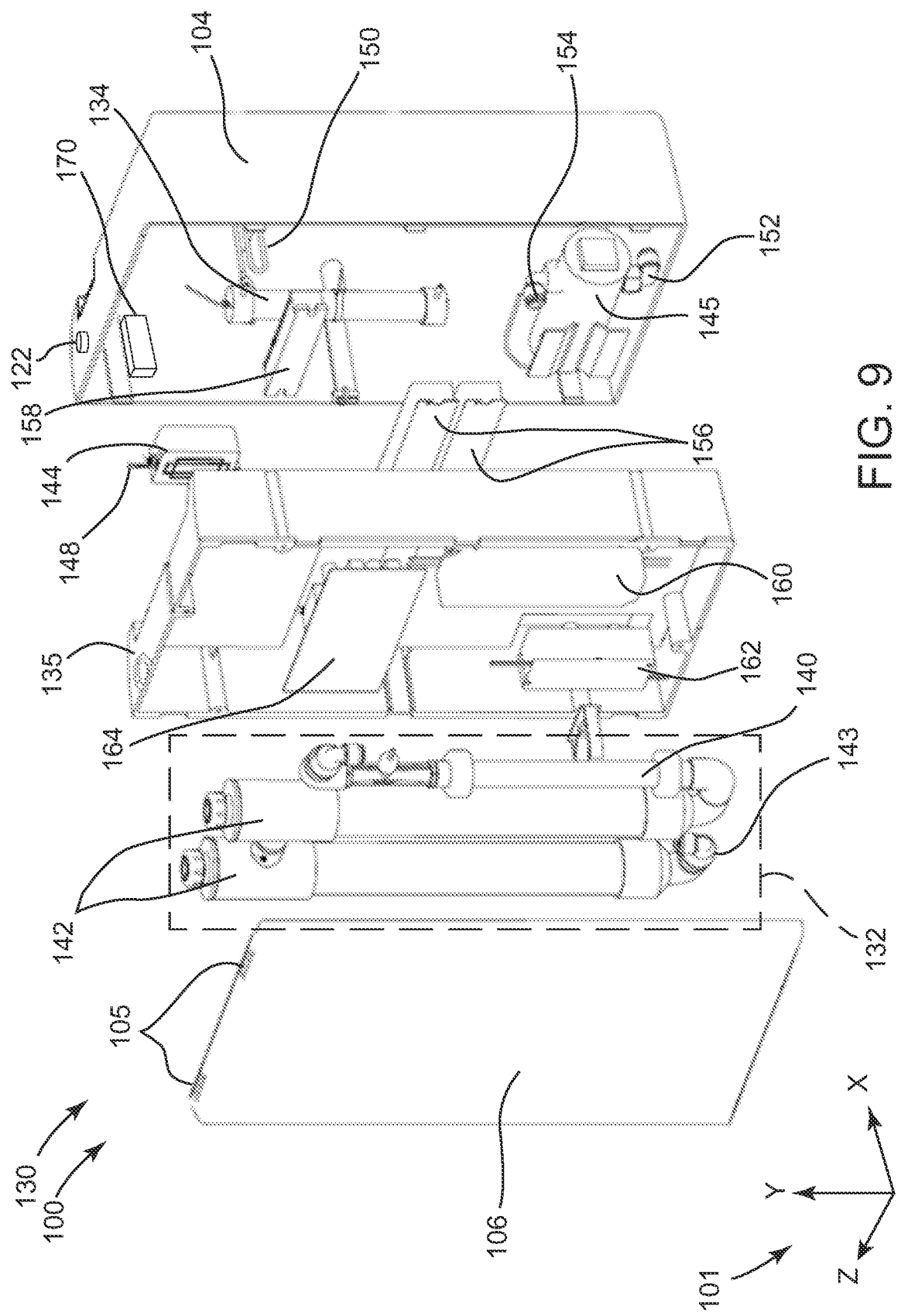
FIG. 9 is an exploded view of the alternative embodiment shown in FIG. 8 of the portable liquid filtration device shown in FIG. 1.

FIG. 8 is a perspective view of an alternative embodiment of portable liquid filtration device 100 (shown in FIG. 1) illustrating a horizontal arrangement of portable housing 102. FIG. 9 is an exploded view of the alternative embodiment (shown in FIG. 8) of portable liquid filtration device 100 (shown in FIG. 1). The embodiment shown in FIGS. 8 and 9 is substantially identical to the embodiment shown in FIG. 1, except portable housing 102 is oriented such that first dimension 111, which is greater than second dimension 113 and third dimension 115, extends parallel to a surface upon which portable housing 102 rests during operation of filtration duct 132. More specifically, in some embodiments, first dimension 111 extends generally horizontally. Thus, flow through oxidation chambers 140 and UV chambers 142, which is aligned with first dimension 111, is also substantially horizontal, which tends to reduce dynamic effects of the flow on portable housing 102. Configuring portable liquid filtration device 100 in a primarily horizontal layout facilitates decreasing the overall height of portable housing 102 with respect to the vertical, Z-direction and facilitates a stability of portable liquid filtration device 100 in certain operational environments. For example, configuring portable liquid filtration device 100 such that first dimension 111 extends along the horizontal X-direction facilitates lowering and stabilizing portable liquid filtration device's 100 center of gravity such that portable liquid filtration device 100 is less likely to tip over during operation of portable liquid filtration device 100, In alternative embodiments, portable housing 102 and filtration assembly 130 may be arranged in any manner that facilitates operation of portable liquid filtration device 100 as described herein.

Figure 10:
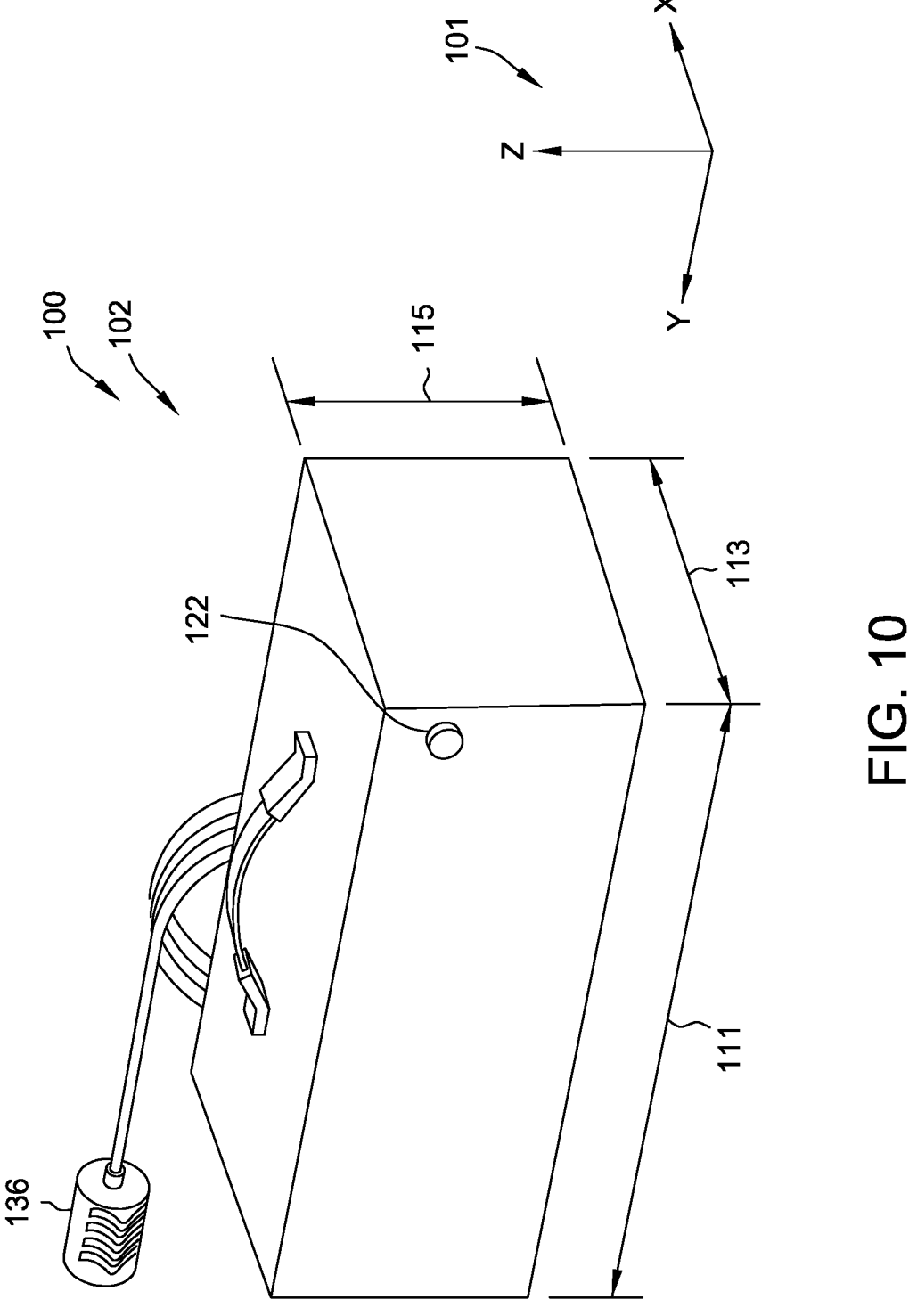
FIG. 10 is a perspective view of an alternative embodiment of the portable liquid filtration device shown in FIG. 1.
Figure 11:
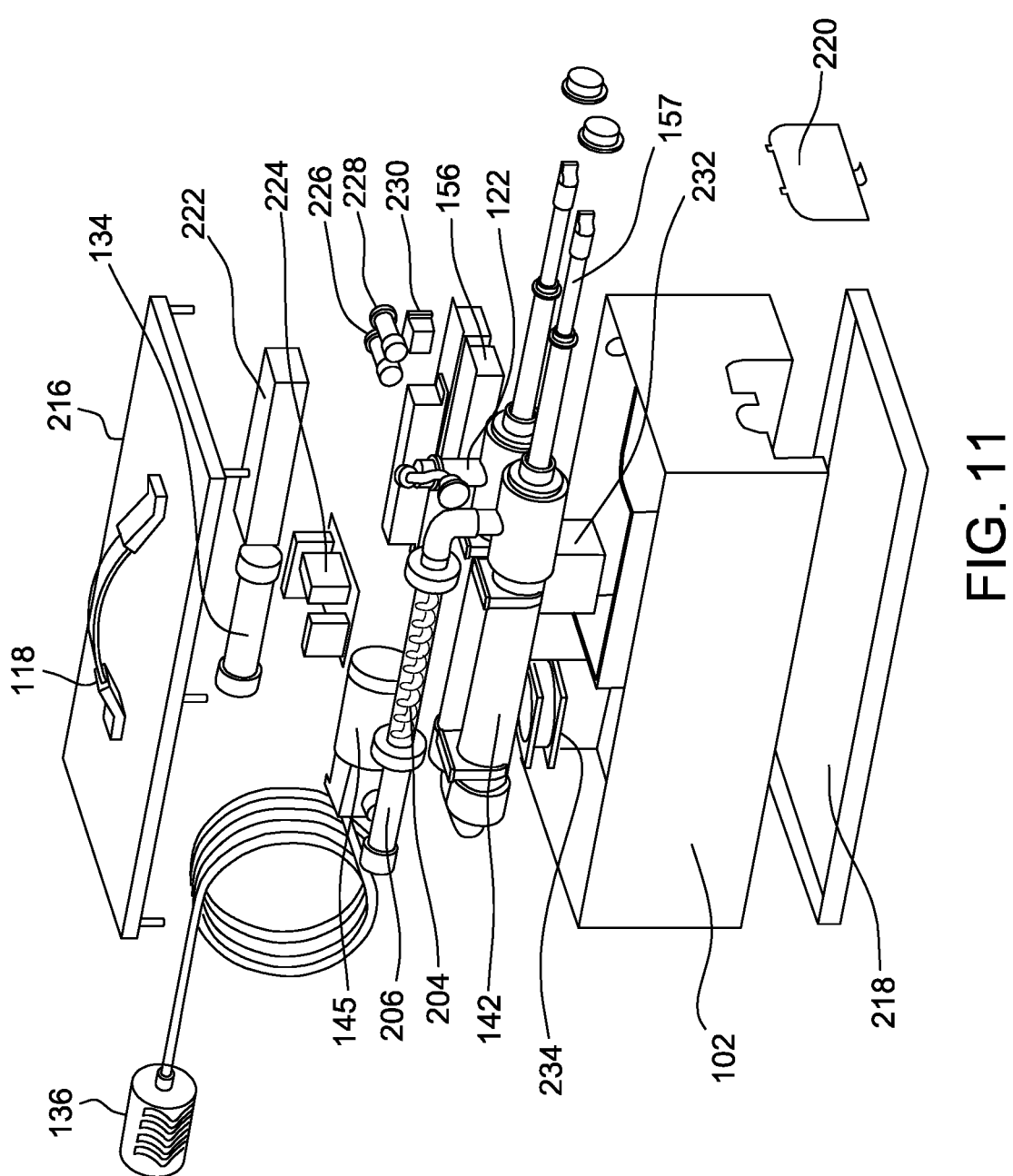
FIG. 11 is an exploded view of the alternative embodiment shown in FIG. 10 of the portable liquid filtration device shown in FIG. 1.

FIG. 10 is a perspective view of an alternative embodiment of portable liquid filtration device 100 (shown in FIG. 1) illustrating a horizontal arrangement of portable housing 102. FIG. 11 is an exploded view of the alternative embodiment (shown in FIG. 10) of portable liquid filtration device 100 (shown in FIG. 1). Device 100 includes a top cover 216, a bottom cover 218, and a side cover 220 that are selectively coupled to housing 102. Device 100 also includes a pump inverter 222, an ADC adapter 224, a DC port 226, an AC port 228, and an ADC switch 230. Device 100 also includes an ozone generator inverter 232 and a fan 234.

With reference to FIGS. 1-9, in certain embodiments, portable liquid filtration device 100 weighs less than 50 pounds, is sized to be received within a volume measuring no more than four cubic feet, and is operable to output at least 150 liters per hour of the received water from outlet 122 as potable water. In some such embodiments, portable liquid filtration device 100 is sized to be received within a volume measuring no more than two cubic feet, further facilitating the transportation of portable liquid filtration device 100 to supply potable water to areas of need. Additionally or alternatively, in some such embodiments, portable liquid filtration device 100 is operable to output at least 150 liters per hour of the received water from outlet 122 as potable water.

Moreover, portable liquid filtration device 100 is of robust construction and operable over a long lifetime. In some embodiments, portable liquid filtration device 100 is operable to produce at least 500,000 total liters of potable water before requiring repair or replacement of any component (other than external battery 128 and/or internal battery 166, if not recharged). Moreover, in some such embodiments, portable liquid filtration device 100 is operable to produce at least to produce between about 800,000 liters and about 1,000,000 million total liters of potable water before requiring repair or replacement of any component (other than external battery 128 and/or internal battery 166, if not recharged). In particular, in some such embodiments, portable liquid filtration device 100 is operable to produce about 1,600,000 total liters of potable water before requiring repair or replacement of any component (other than external battery 128 and/or internal battery 166, if not recharged). In alternative embodiments, portable liquid filtration device 100 is operable to produce any suitable amount of potable water before requiring repair or replacement of any component (other than internal battery 166, if not recharged).

Thus, portable liquid filtration device 100 has a limited weight and bulk that facilitates transportation of portable liquid filtration device 100 to areas of need, such as by manual transport by a user or small group of users over unimproved terrain if necessary, and also provides a high-volume output that reduces a number of water filtration units needed to meet emergency potable water requirements for a large number of people and/or over a long time period. Moreover, portable liquid filtration device 100 requires no additional assembly or set-up upon arrival at the site of need, but rather is ready to immediately generate potable water. Moreover, operation using replaceable and/or rechargeable external battery 128 (shown in FIG. 1) and/or internal battery 166 (shown in FIG. 7), located within portable housing 102 or separately provided, further facilitates use in areas where a power grid is offline or non-existent. In alternative embodiments, portable liquid filtration device 100 has any suitable weight and volume that enables portable liquid filtration device 100 to function as described herein.

The above-described embodiments of portable liquid filtration devices overcome at least some disadvantages of known water purification systems. Specifically, embodiments of the portable liquid filtration device include a portable housing, an inlet and an outlet, an ozone chamber, and a filtration duct including at least oxidation chamber and at least one UV chamber that cooperate together to sanitize the received water at an output of 400 liters per hour or more. Also specifically, in some embodiments, the device weighs no more than 50 pounds and/or occupies no more than four cubic feet, or even no more than two cubic feet. Also specifically, the device does not require internal filters that have to be replaced on a routine basis and/or that limit the flow rate of water through the portable liquid filtration device. Also specifically, in at least some embodiments, the portable liquid filtration device may be powered by a replaceable or rechargeable battery while producing 2,000 liters of potable water on a single battery charge.

FIGS. 12-18 illustrate yet another alternative embodiment of portable liquid filtration device 400. The portable liquid filtration device 400 shown in FIGS. 12-18 is substantially the same as the device 100 shown in FIGS. 1, 8, and 10, except as described differently below.

Figure 12:
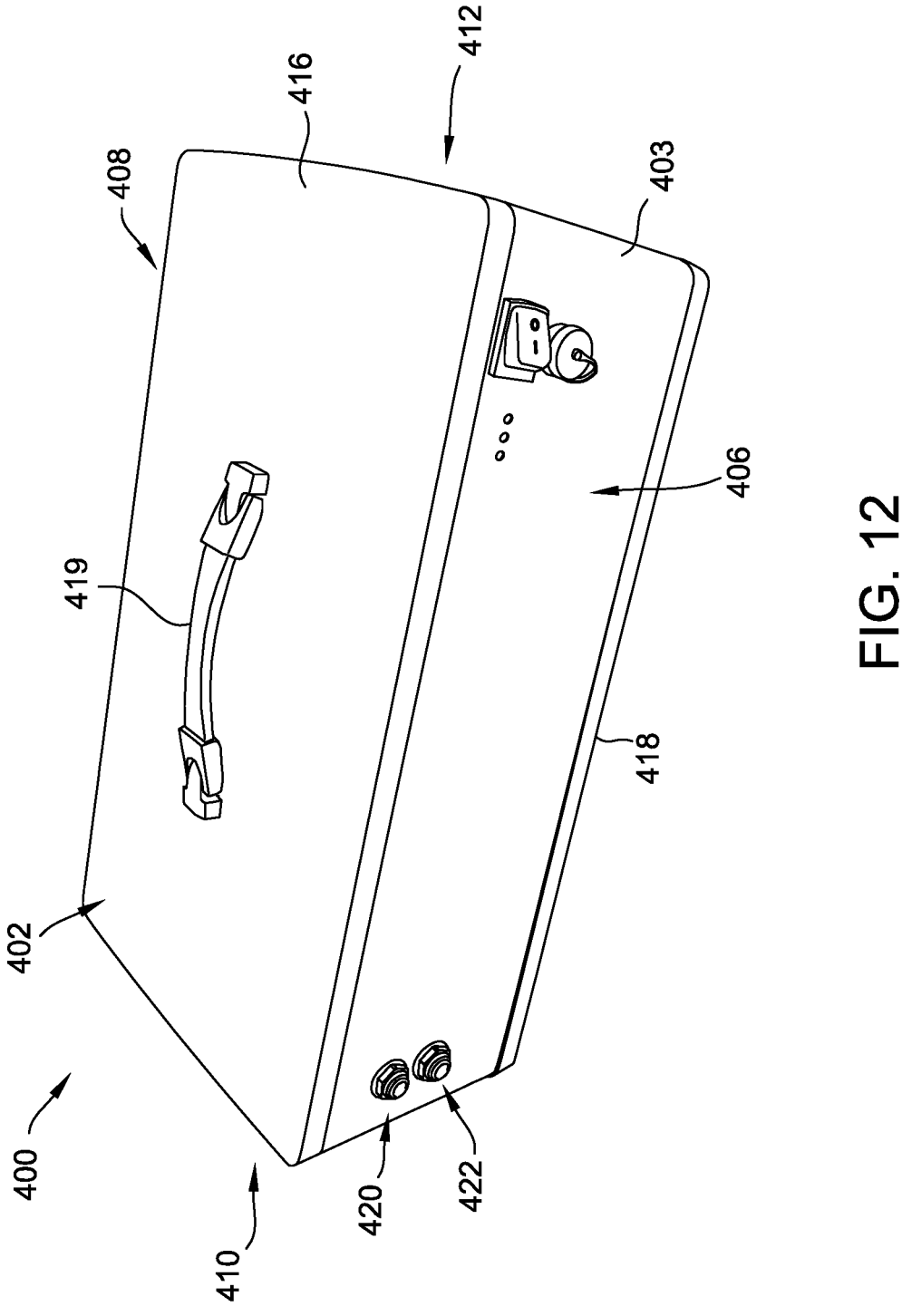
FIG. 12 is a perspective view of an alternative embodiment of the portable liquid filtration device shown in FIG. 1.
Figure 13:
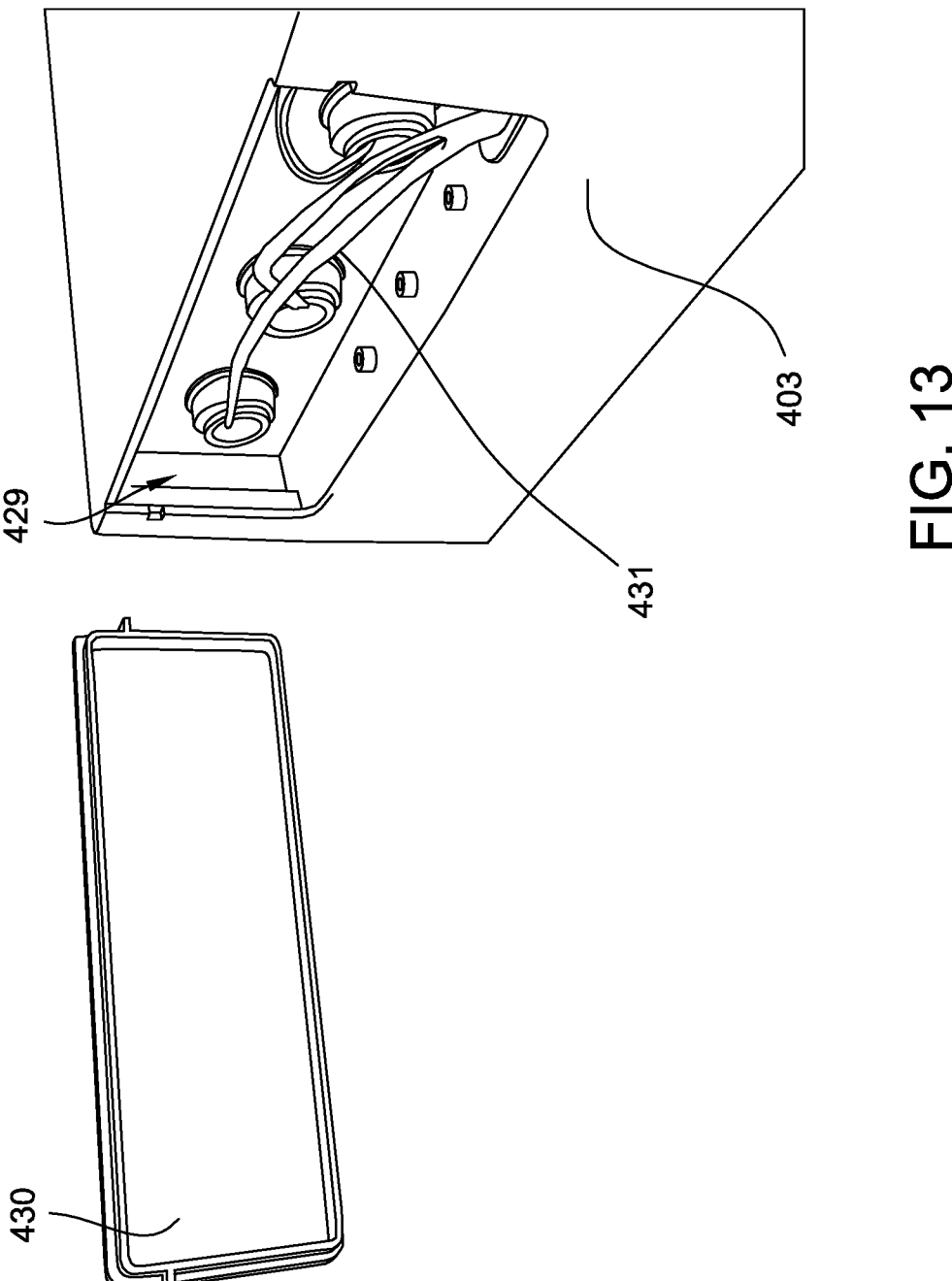
FIG. 13 is an enlarged perspective view of a portion of an exemplary housing of the portable liquid filtration device shown in FIG. 12, showing a removeable side cover removed.

As shown in FIGS. 12 and 13, the filtration device 400 includes a housing 402 that includes a top cover 416, a central housing 403, and a bottom cover 418. The housing 402 includes a front end 406, a rear end 408, and a first side 410 and a second side 412 that each extend from the front end 406 to the rear end 408. Inlet 420 and outlet ports 422 are included on the central housing 403 and protrude a distance outward therefrom. In the exemplary embodiment, the device 400 is designed as a single unit. Specifically, top cover 416, bottom cover 418, and central housing 403 are coupled or bonded together by one or more fastening mechanisms (e.g., adhesive and/or fasteners) to substantially prevent access and/or to discourage accessing internal cavities 424, 426 (shown in FIGS. 14 and 18) of the filtration device 400. A handle 419 is coupled to the top cover 416 for lifting device 400.

Referring to FIG. 13, in the exemplary embodiment, the central housing 403 includes a removable side cover 430 that is selectively removable to provide access to a recessed section 429 of the central housing 403. The recessed section 429 includes power lines 431 extending therewithin used to provide power to UV lamps 157 (shown in FIG. 6) within UV chambers 442 (shown in FIG. 14).

Figure 14:
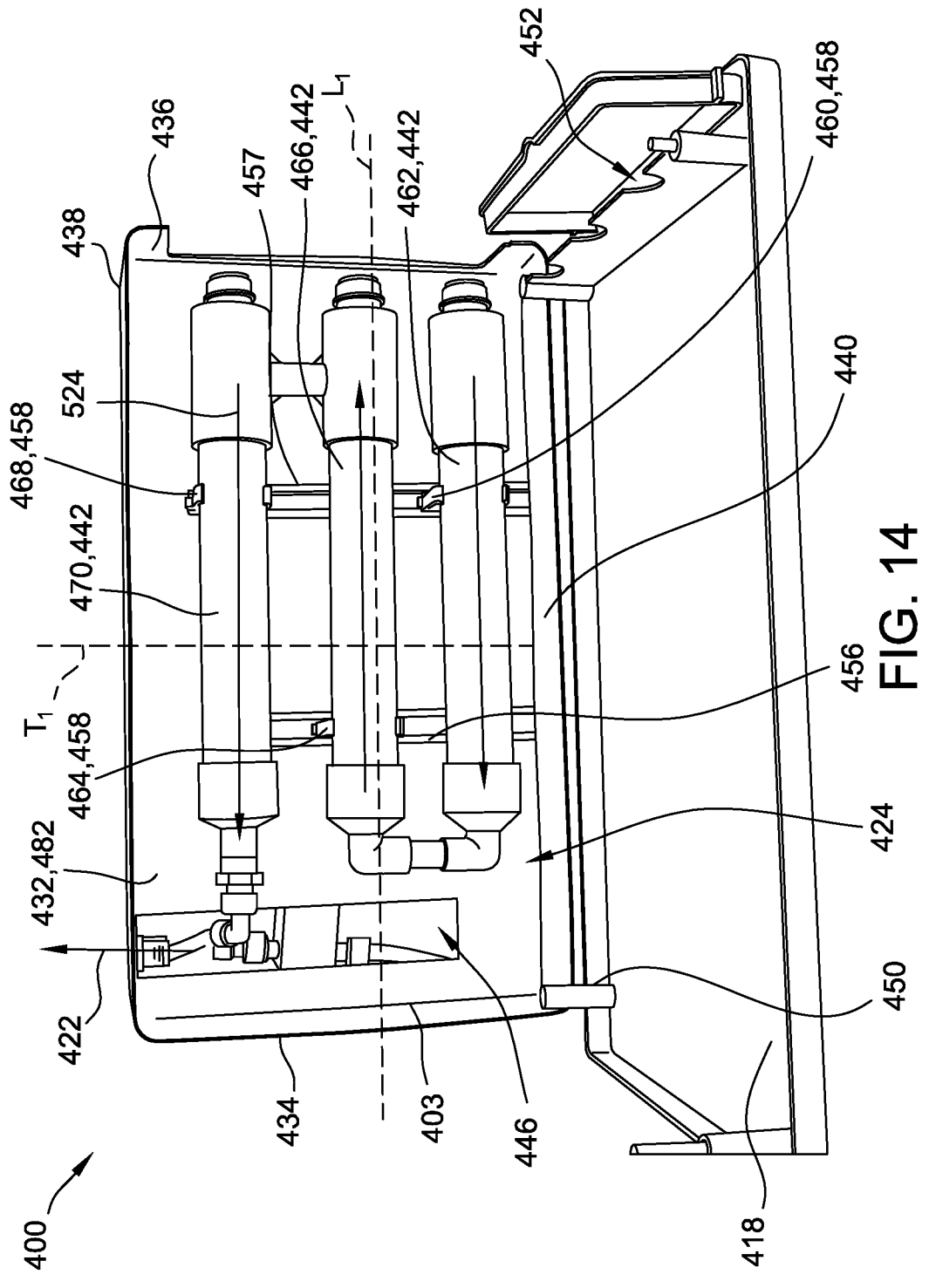
FIG. 14 is a bottom view of the portable liquid filtration device shown in FIG. 12, with a bottom cover of the device separated from a central housing to reveal a bottom cavity.

Referring to FIG. 14, the bottom cover 418 is shown separated from the central housing 403 to reveal a bottom cavity 424 defined within the device 400. More specifically, the bottom cavity 424 is at least partially defined by the bottom cover 418 and an intermediate cover 432 of the central housing 403.

The central housing 403 includes a first side wall 434, a second side wall 436, a first end wall 438, and a second end wall 440. The first and second end walls 438, 440 each extend between the opposed first and second side walls 434, 436. The housing 402 is defined by a longitudinal axis Li that extends through the first side wall 434 and the second side wall 436 and a transverse axis Ti that extends through the first end wall 438 and the second end wall 440. The transverse axis Ti defines the X-axis and the longitudinal axis Li defines the Y-axis of coordinate system 101 (shown in FIG. 10).

The intermediate cover 432 generally spans across a full length and width of the central housing 403 to substantially isolate the UV chambers 442 from electronic components 444 (shown in FIG. 18) of the device 400. The UV chambers 442 are positioned in the bottom cavity 424, while the electronic components 444 are positioned within a top cavity 426 (shown in FIG. 18) of the device 400, defined at least partially by an opposed side of the intermediate cover 432. A first surface 480 (shown in FIG. 18) of the intermediate cover 432 at least partially defines the top cavity 426 and a second, opposed surface 482 of the intermediate cover 432 at least partially defines the bottom cavity 424. The intermediate cover 432 includes a first opening 446 and a second opening 448 (shown in FIG. 18) defined therein that enable a flow of fluid (shown by flow arrows 524 in FIGS. 14 and 18) to pass between the top cavity 426 and the bottom cavity 424.

The bottom cover 418 includes coupling projections 450 which facilitate coupling the bottom cover 418 to the central housing 403. The bottom cover 418 also includes a plurality of chamber seats 452 that hold the ends of the UV chambers 442 on the intermediate cover 432.

Figure 15:
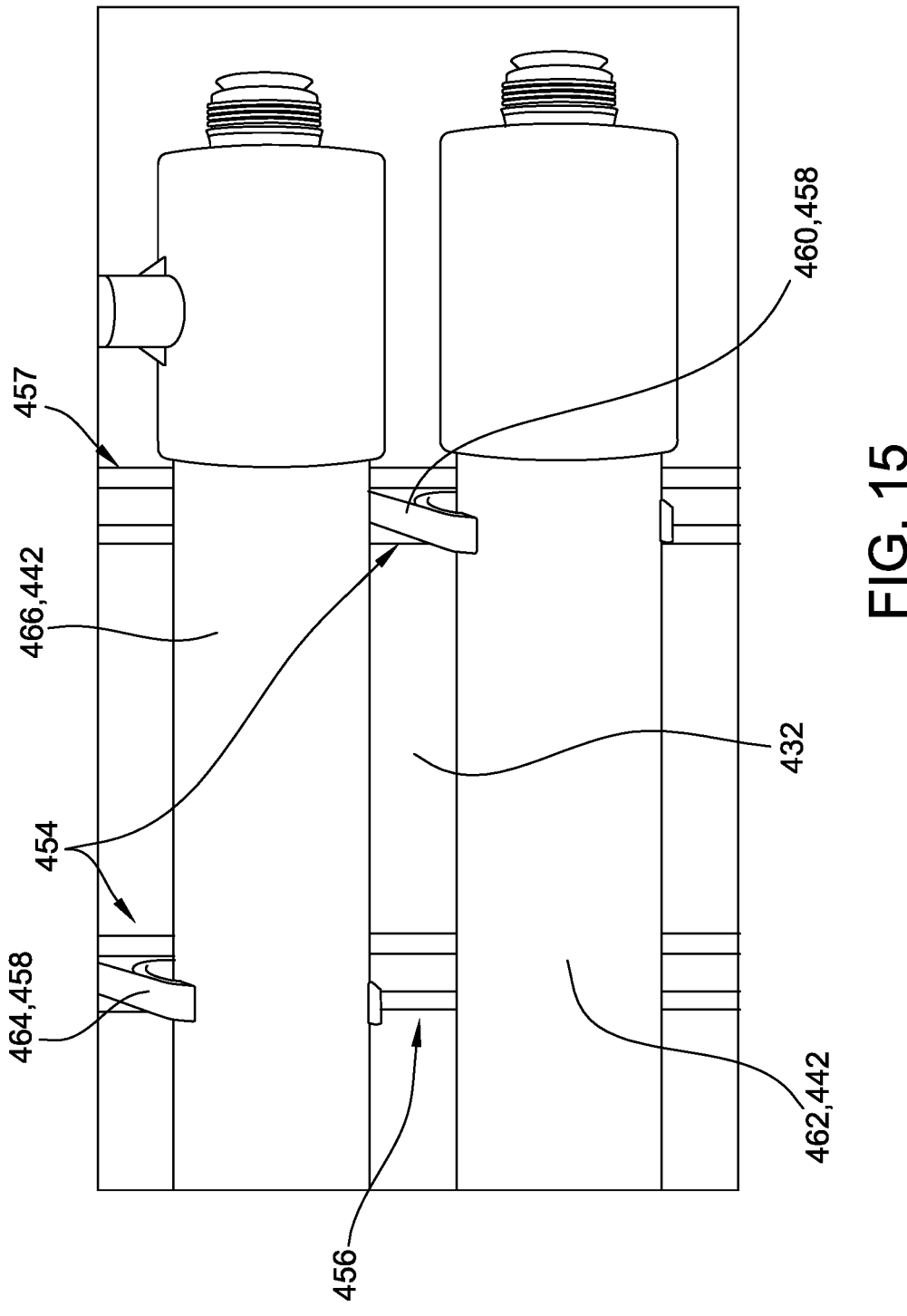
FIG. 15 is an enlarged perspective showing an exemplary mounting assembly of the portable liquid filtration device shown in FIG. 12.

Referring to FIG. 15, in the exemplary embodiment, the device 400 further includes a mounting assembly 454 for coupling UV chambers 442 to housing 402. The mounting assembly 454 includes a first set of rails 456 and a second set of rails 457 that are spaced laterally from the first set of rails 456. A plurality of clamp mounts 458 are slidably coupled to one of the rails 456 or 457. The clamp mounts 458 engage and retain a respective one of UV chambers 442 on the intermediate cover 432. The clamp mounts 458 are coupled to the intermediate cover 432 via engagement with the rails 456, 457 such that the respective UV chamber 442 is supported in position and spaced a distance from the intermediate cover 432. As such, in such an embodiment, the UV chambers 442 do not contact the intermediate cover 432.

The clamp mounts 458 engage the rails 456, 457 in a friction-fit such that the mounts 458 are maintained in their position relative to the rails 456, 457. The clamp mounts 458 are also selectively positionable along the rails 456, 457 to enable a relative position of the clamp mounts 458 to be varied and/or adjusted as necessary during assembly. For example, referring back to FIG. 14, in the exemplary embodiment, the device 400 includes three clamp mounts 458 wherein a first clamp mount 460 is coupled to the second rail 457 and engaged with the first UV chamber 462, a second clamp mount 464 is coupled to the first set of rails 456 and engaged with the second UV chamber 466, and a third clamp mount 468 is mounted on the second set of rails 457 and engaged with the third UV chamber 470. In other embodiments, device 400 may include any other suitable number of clamp mounts 458. For example, in some embodiments, the device 400 includes six clamp mounts 458, with each UV chamber 462, 466, 470 being engaged by two clamp mounts 458 on the first and second set of rails 456, 457 respectively. Additionally, in the exemplary embodiment, the second set of rails 457 is substantially identical to the first set of rails 456.

Figure 16:
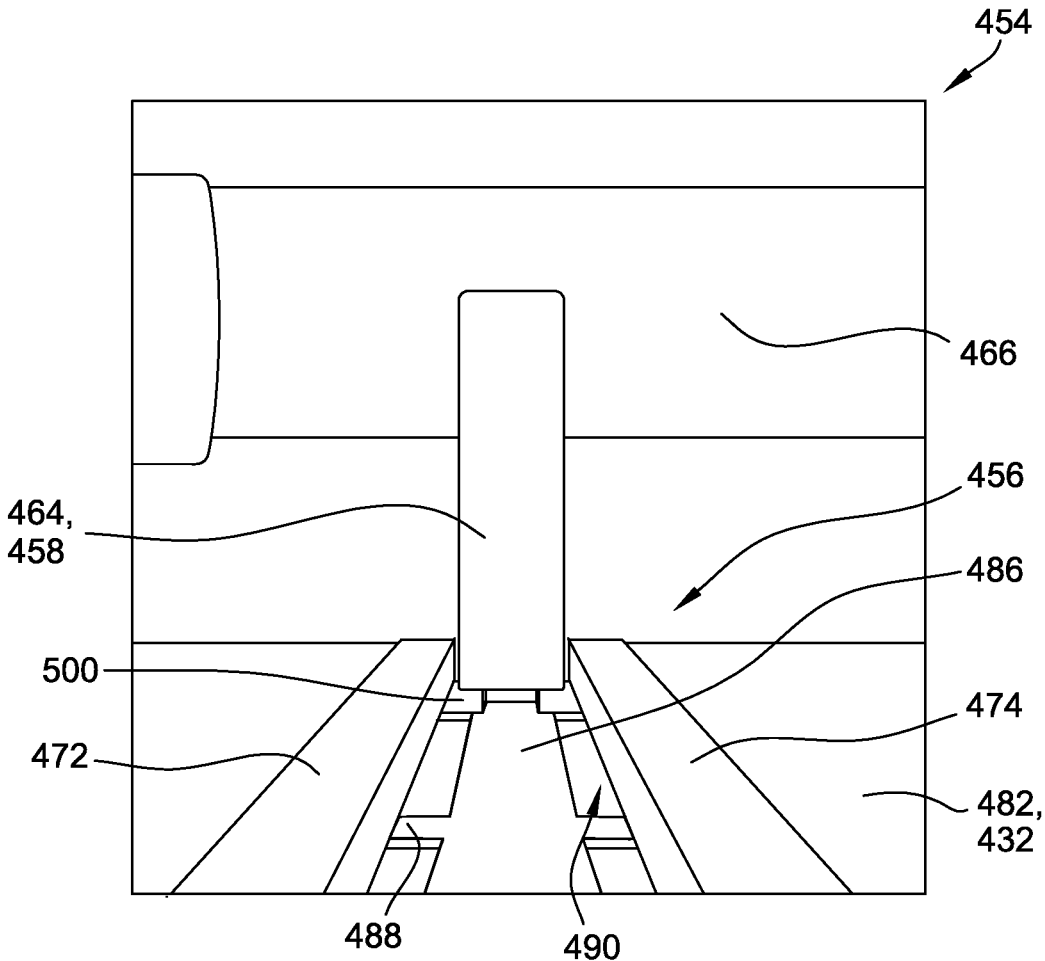
FIG. 16 is an end view of an exemplary clamp mount and UV chamber of the portable liquid filtration device shown in FIG. 12.

FIG. 16 is a bottom perspective view of the mounting assembly 454, and illustrates the second UV chamber 466 as partially removed from the second clamp 464. In the exemplary embodiment, the first set of rails 456 includes a first rail 472 and a second rail 474 that is longitudinally spaced a distance from the first rail 472. The rails 472, 474 extend outwardly from the second surface 482 of the intermediate cover 432. The first set of rails 456 also includes a central track 486 that extends longitudinally between the first and second rails 472 and 474, respectively. The central track 486 extends substantially the entire transverse length of the first set of rails 456. A first rail notch 488 is defined within the first rail 472 and a second rail notch 490 is defined within the second rail 474. In other embodiments, the device 400 may also include a recessed surface (not shown) that engages the clamp mount 458 within the rail notches 488, 490. In such embodiments, the recessed surface may recessed a distance inwardly from the second surface 482 of the intermediate cover 432, or may be formed substantially co-planar with, and/or continuously with, the second surface 482. In some embodiments, the recessed surface and the second surface 482 are the same surface.

Figure 17:
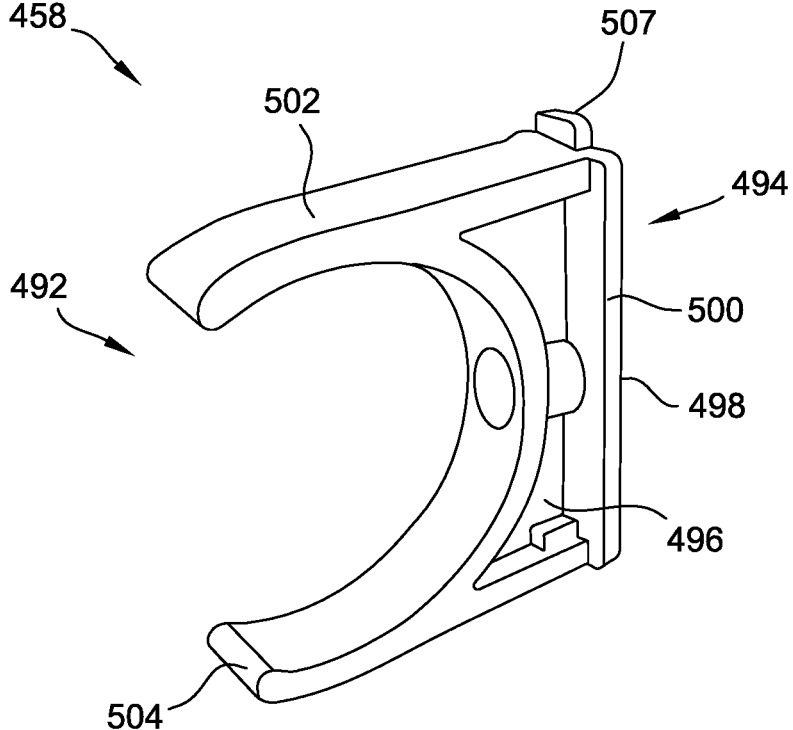
FIG. 17 is a perspective view of the clamp mount shown in FIG. 16.

Referring to FIG. 17, in the exemplary embodiment, the clamp mount 458 includes a first end 492, a second end 494, and a body 496 extending therebetween. The body 496 includes a back wall 498, a flange 500, a nub 507. A pair of grip arms 502, 504 extend outwardly from the first end 492 of the clamp mount 458, and the flange 500, back wall 498, and nub 507, are formed at the second end 494 of the clamp mount 458. The back wall 498 is a generally planar surface and the flange 500 extends laterally outwardly from the body 496 relative to the grip arms 502, 504.

In the exemplary embodiment, the first and second grip arms 502, 504 are resiliently flexible and may be forced away from one another to receive the UV chambers 442 (as shown in FIG. 16) therein. The arms 502 and 504 are biased inwardly to enable the UV chamber 442 to be clamped and retained between the arms 502, 504. In the exemplary embodiment, the first grip arm 502 and second grip arm 504 collectively define a "C-shaped" profile of the clamp mount 458. In other embodiments, clamp body 496 may have any other suitable shape that facilitates engagement with the UV chamber 442, as described herein.

Referring back to FIG. 16, the clamp mount 458 is coupled to the intermediate cover 432 and is received between the rails 472, 474. More specifically, the flange 500 of the clamp mount 458 extends into the first rail notch 488 and into the second rail notch 490 in a friction fit with the rails 472, 474. The central track 486 contacts the back wall 498 and urges the flange 500 into engagement with the first rail 472 and the second rail 474. The clamp mount 458 maintains a transverse position on the rails 472, 474, while being slideable, e.g., through the application of a force on the clamp mount 458 sufficient to overcome the static friction between the clamp mount 458 and the rails 472, 474, to move the clamp mount 458 along the rails 472, 474 and to enable different configurations of the UV chamber 442 (shown in FIG. 14). In other embodiments, the clamp mounts 458 may be securely coupled and fixed in position to the rails 472, 474 and/or central track 486 via fasteners (not shown).

Figure 18:
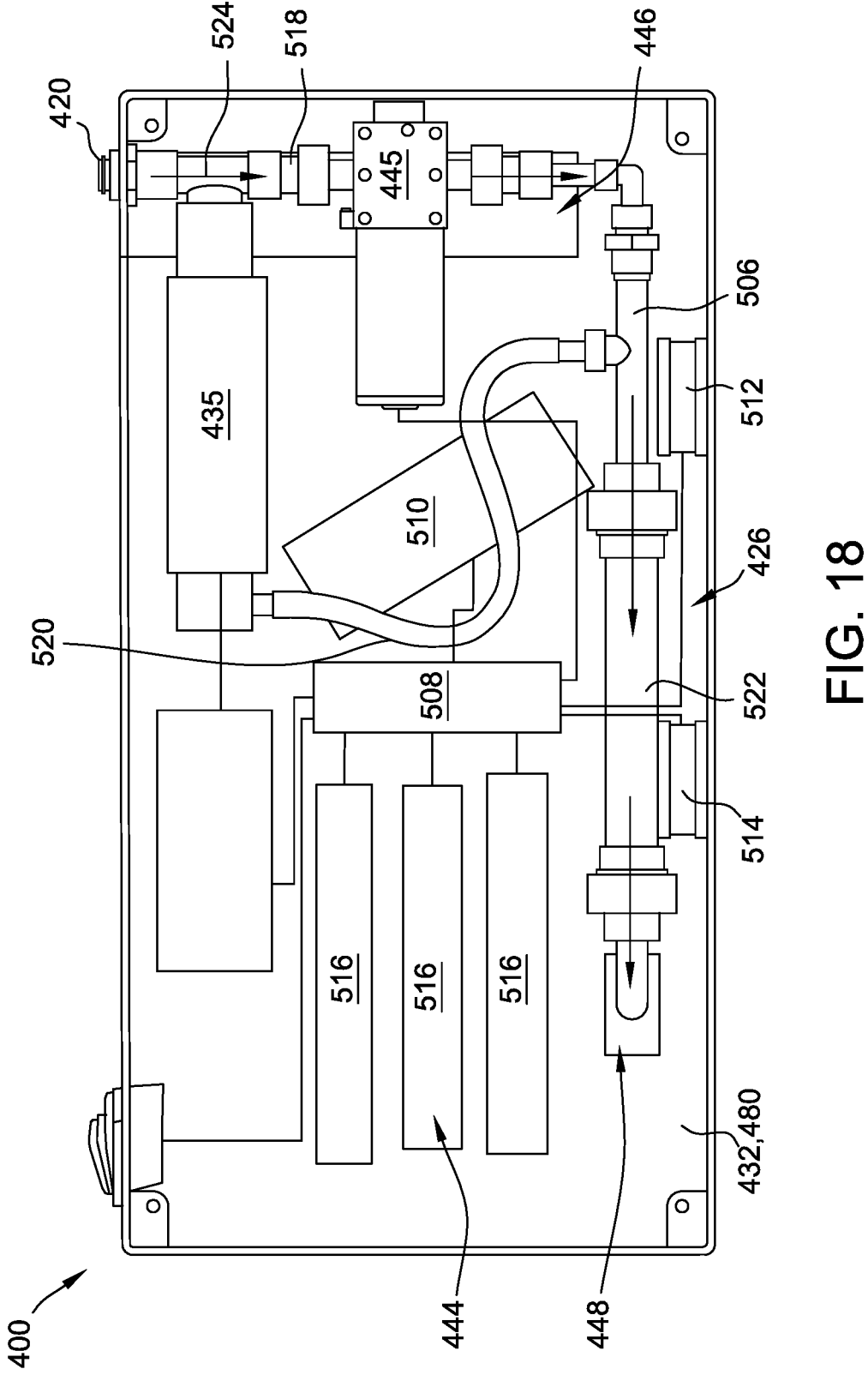
FIG. 18 is a top view of the portable liquid filtration device shown in FIG. 12, with a top cover of the device separated from the housing to reveal a top cavity.

FIG. 18 shows the device 400 with the top cover 416 (shown in FIG. 12) removed to reveal the top cavity 426. In the illustrated embodiment, the device 400 includes an ozone chamber 435, a water pump 445, a venturi nozzle 506, a distribution block 508, a pump inverter 510, a pair of fans 512, 514, and a plurality of lamp ballasts 516 are received within the top cavity 426 of the device 400. Lamp ballasts 516, distribution block 508, pump inverter 510, water pump 445, and ozone chamber 435 are collectively referred to herein as electronic components 444. Device 400 is not limited to only including components 444 and may include other components that facilitate the operation and efficiency of device 400, such as, but not limited to, a GPS tracking device, a battery life indicator, a wireless phone charger port, and/or an electronic locator beacon. The electronic components 444 are each coupled to the first surface 480 of intermediate cover 432 in the top cavity 426.

During operation, water pump 445 drives a flow of fluid to be purified through the inlet port 420 and into tubing 518 extending through the top cavity 426. The ozone chamber 435 generates ozone gas, that is introduced into the flow of fluid via ozone tubing 520 extending to the venturi nozzle 506. The ozone and fluid are mixed and turbulated within the venturi nozzle 506 and a mixing chamber 522. The resulting fluid mixture is then directed through the second opening 448 and into the bottom cavity 424 (shown in FIG. 14). Referring to FIG. 14, fluid is directed through each of the UV chambers 442 along a path illustrated by the flow arrows 524 and to the outlet port 422.

In some embodiments, the portable liquid filtration devices 100, 400 described herein are buoyant and will float in an aqueous environment such as a lake, river, or stream. For example, in some embodiments, the housing 402 may be partially formed of a buoyant material. In other embodiments, a buoyant floatation device (not shown) may be removably or fixably coupled to the housing 402. In some such embodiments, the buoyant flotation device may extend around an outer perimeter of the housing 402 to provide a distributed buoyancy to the housing 402. In some embodiments, the devices 100, 400 may be closed with a watertight seal such that the devices 100, 400 remain operable for water filtration as described herein after being at least partially submerged in the aqueous environment. For example, in some embodiments, the devices 100, 400 may include at least one fan 232, 512, and/or 514 that is operable when at least partially submerged in liquid. In other embodiments, each opening, such as openings 105, and/or vent 108, formed in housing 402 is defined by a tortuous flow path that includes drain lines that make it difficult for liquid to enter housing 402 if device 100, 400 is submerged in liquid.

Exemplary embodiments of a portable liquid filtration device, and methods of assembling the same, are described above in detail. The systems and methods are not limited to the specific embodiments described herein, but rather, components of systems and/or steps of methods may be utilized independently and separately from other components and/or steps described herein. For example, the system may also be used in combination with other water purification systems and methods, and is not limited to practice with only a portable liquid filtration device as described herein. Rather, the embodiments can be implemented and utilized in connection with many other liquid purification applications.

Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to illustrate the disclosure and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A portable liquid filtration device comprising:
a portable housing comprising a first side wall, a second side wall opposite said first side wall, and an intermediate cover extending from said first side wall to said second side wall, wherein said intermediate cover includes a first surface and a second surface opposite said first surface, said first surface at least partially defines a first cavity within said housing and said second surface at least partially defines a second cavity within said housing;
an inlet defined on said portable housing and oriented to receive liquid therethrough;
an outlet defined on said portable housing and oriented to discharge liquid therethrough;
an ultraviolet (UV) chamber in downstream flow communication with said inlet, said UV chamber comprising a UV lamp configured to irradiate the liquid with UV light wherein said UV chamber is within the second cavity;
a plurality of electronic components positioned within the first cavity and coupled to said first surface; and
a mounting assembly for coupling said UV chamber to said housing, said mounting assembly comprising:
a set of rails coupled to said housing, said set of rails defining a corresponding rail notch; and
a clamp comprising a first grip arm at a first end of said clamp and a flange at a second, opposite end of said clamp, said first grip arm shaped to secure said UV chamber to said clamp, wherein said flange provides a friction fit between said clamp and said set of rails.

2. The portable liquid filtration device of claim 1, wherein said set of rails are coupled to said intermediate cover.

3. The portable liquid filtration device of claim 2, wherein said UV chamber is positioned in the second cavity and said set of rails are positioned on said second surface of said intermediate cover.

4. The portable liquid filtration device of claim 3 wherein said plurality of electronic components comprise at least one of a lamp ballast, an electrical distribution block, a pump, a pump inverter, and an ozone chamber.

5. The portable liquid filtration device of claim 1, wherein said clamp further comprises a second grip arm at said first end of said clamp, at least one of said first grip arm and said second grip arm is resiliently flexible such that at least one of said first grip arm and said second grip arm is bendable a distance away from the other of the at least one of said first grip arm and said second grip arm to enable at least a portion of said UV chamber be received therebetween.

6. The portable liquid filtration device of claim 1, wherein said portable housing comprises a first side wall, a second side wall opposed to said first side wall, and an intermediate cover extending from said first side wall to said second side wall,
wherein said set of rails includes a first rail and a second rail spaced a distance from said first rail, said first rail and said second rail each being coupled to said intermediate cover and projecting outwardly from a surface of said intermediate cover,
wherein said mounting assembly further comprises a central track extending longitudinally between said first and second rails, and
wherein said clamp includes a back wall at said second end of said flange, said back wall contacting said central track.

7. The portable liquid filtration device of claim 1, wherein said clamp is slidably coupled to said set of rails to facilitate selective positioning of said clamp along said set of rails to without removing said clamp from said set of rails.

8. The portable liquid filtration device of claim 1, wherein said device defines a longitudinal axis extending through said first side wall and said second side wall, and a transverse axis extending through said first end wall and said second end wall, wherein said set of rails are substantially parallel to the transverse axis.

9. The portable liquid filtration device of claim 8, wherein said UV chamber is a first UV chamber and said UV lamp is a first UV lamp, said portable liquid filtration device further comprises a second UV chamber in flow communication with said first UV chamber and comprising a second UV lamp configured to irradiate the liquid with UV light, wherein the liquid flows through said first UV chamber in a first direction through a first flow path and through said second UV chamber in a second opposite direction through a second flow path, wherein the first direction and second directions are each substantially parallel to the longitudinal axis.

10. The portable liquid filtration device of claim 9 further comprising a third UV chamber in flow communication with said second UV chamber, said third UV chamber comprising a third UV lamp configured to irradiate the liquid with UV light, wherein the liquid flows through said third UV chamber in the first direction through a third flow path that is substantially parallel to the first direction and opposite to the second direction.

11. The portable liquid filtration device of claim 10, wherein said set of rails includes a first rail and said clamp is a first clamp, and wherein said mounting assembly further comprises:

a second rail coupled to said housing and longitudinally-spaced from said first rail;

a second clamp for coupling said second UV chamber to said housing; and a third clamp for coupling said third UV chamber to said housing, wherein said second clamp and said third clamp are each coupled in a friction fit with one of said first rail and said second rail.

12. The portable liquid filtration device of claim 11, wherein said second clamp is coupled to said second rail and said third clamp is coupled to said first rail, said third clamp positioned in said portable housing between said outlet and said first clamp.

13. The portable liquid filtration device of claim 1, wherein said clamp is coupled to said intermediate cover such that said UV chamber is maintained a distance from said intermediate cover such that said UV chamber does not contact said intermediate cover.

14. A mounting assembly for coupling a ultraviolet (UV) chamber having a UV lamp to a housing of a portable liquid filtration device, said mounting assembly comprising:

a pair of rails configured to be coupled to an intermediate cover of said housing, said pair of rails comprise at least a first rail and a second rail spaced from said first rail, said first and second rails each coupled to said intermediate cover and projecting outward from said intermediate cover, each said pair of rails defining a corresponding rail notch therein when coupled to the housing;

a central track extending between said first and second rails; and a clamp comprising a grip arm at a first end of said clamp and a flange at a second, opposite end of said clamp, said grip arm being shaped to secure the UV chamber to said clamp, wherein said flange provides a friction fit between said clamp and said pair of rails, wherein said clamp comprises a back wall at said second end, said back wall contacting said central track.

15. The mounting assembly of claim 14, wherein said first rail and said second rail each project outward from a surface of the intermediate cover.

16. The mounting assembly of claim 14, wherein said clamp is slidably coupled to said pair of rails to facilitate sliding said clamp along said pair of rails to reposition said clamp without removing said clamp from said pair of rails.

17. The mounting assembly of claim 14, wherein said pair of rails includes a first rail and said clamp is a first clamp, and wherein said mounting assembly further comprises:

a second rail is configured to be coupled to the housing, said mounting assembly further comprises:

a second clamp for coupling a second UV chamber to the housing; and a third clamp for coupling a third UV chamber to the housing, wherein said second clamp and said third clamp are each coupled in a friction fit with one of said first rail and said second rail.

18. A portable liquid filtration device comprising:

a housing comprising a first side wall, a second side wall opposite said first side wall, and an intermediate cover extending from said first side wall to said second side wall, wherein said intermediate cover includes a first surface and a second surface opposite said first surface, said first surface at least partially defining a first cavity of said housing and said second surface at least partially defining a second cavity of said housing;

an ultraviolet (UV) chamber comprising a UV lamp configured to irradiate the liquid with UV light, said UV chamber is within said second cavity;

a set of rails coupled to said housing, said set of rails defining a corresponding rail notch; and a mount comprising a grip arm at a first end of said mount and a flange at a second, opposite end of said mount, said grip arm being shaped to secure said UV chamber to said mount, wherein said flange provides a friction fit between said mount and said set of rails for securing said UV chamber to said housing.

19. The portable liquid filtration device of claim 18, wherein said housing comprises set of rails are coupled to said intermediate cover.

20. The portable liquid filtration device of claim 19, wherein said set of rails are positioned on said second surface of said intermediate cover.

* * * * *